US010665837B2

(12) United States Patent
Tononishi et al.

(10) Patent No.: US 10,665,837 B2
(45) Date of Patent: May 26, 2020

(54) ENERGY STORAGE APPARATUS

(71) Applicant: GS Yuasa International Ltd., Kyoto-shi (JP)

(72) Inventors: Masamitsu Tononishi, Kyoto (JP); Yuta Kawai, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 387 days.

(21) Appl. No.: 15/425,845

(22) Filed: Feb. 6, 2017

(65) Prior Publication Data

US 2017/0244081 A1 Aug. 24, 2017

(30) Foreign Application Priority Data

Feb. 23, 2016 (JP) ................................. 2016-032536

(51) Int. Cl.
*H01M 2/12* (2006.01)
*H01G 11/18* (2013.01)
(Continued)

(52) U.S. Cl.
CPC ............ *H01M 2/1241* (2013.01); *H01G 9/10* (2013.01); *H01G 9/12* (2013.01); *H01G 11/18* (2013.01); *H01G 11/78* (2013.01); *H01M 2/0237* (2013.01); *H01M 2/1077* (2013.01); *H01M 2/1094* (2013.01); *H01M 2/1264* (2013.01); *H01M 10/0525* (2013.01); *H01M 10/613* (2015.04); *H01M 10/62* (2015.04);
(Continued)

(58) Field of Classification Search
CPC ............ H01M 2/1241; H01M 2/1077; H01M 2/1094; H01M 2/1264; H01M 10/0525; H01G 9/12; H01G 9/10
See application file for complete search history.

(56) References Cited

U.S. PATENT DOCUMENTS

| 8,426,048 B2 | 4/2013 | Fujikawa et al. |
| 2004/0086778 A1* | 5/2004 | Nakano ............... H01M 2/1252 429/82 |

(Continued)

FOREIGN PATENT DOCUMENTS

| JP | U 06-009054 A | 2/1994 |
| JP | H 07-232585 A | 9/1995 |

(Continued)

*Primary Examiner* — Stewart A Fraser
*Assistant Examiner* — Claire L Roe
(74) *Attorney, Agent, or Firm* — McGinn I. P. Law Group, PLLC.

(57) ABSTRACT

An energy storage apparatus includes an outer case, and an energy storage device housed in an inside of the outer case. The outer case includes a ventilation chamber which makes the inside and an outside of the outer case communicate with each other. The ventilation chamber includes a front wall in which a through hole communicating with the outside is formed, a back wall disposed at a position where the back wall opposedly faces the front wall, a first wall disposed between the through hole and the back wall, and a first side wall disposed in an extending manner along a first direction which intersects with the front wall with a gap formed between the first side wall and the first wall. The gap is formed over a distance from the front wall to the back wall along the first direction.

15 Claims, 9 Drawing Sheets

(51) Int. Cl.
*H01G 11/78* (2013.01)
*H01M 2/02* (2006.01)
*H01M 10/62* (2014.01)
*H01M 10/625* (2014.01)
*H01M 10/6563* (2014.01)
*H01M 10/613* (2014.01)
*H01G 9/10* (2006.01)
*H01G 9/12* (2006.01)
*H01M 2/10* (2006.01)
*H01M 10/0525* (2010.01)

(52) U.S. Cl.
CPC ..... *H01M 10/625* (2015.04); *H01M 10/6563* (2015.04); *H01M 2200/20* (2013.01); *H01M 2220/20* (2013.01); *Y02E 60/13* (2013.01)

(56) References Cited

U.S. PATENT DOCUMENTS

| | | | |
|---|---|---|---|
| 2015/0030893 A1* | 1/2015 | Mack | H01M 2/1223 429/56 |
| 2015/0072184 A1 | 3/2015 | Kusunoki et al. | |

FOREIGN PATENT DOCUMENTS

| | | |
|---|---|---|
| JP | 2004-172099 A | 6/2004 |
| JP | 2005-166318 A | 6/2005 |
| JP | 2005-228649 A | 8/2005 |
| JP | 2009-212081 A | 9/2009 |
| JP | 2011-171039 A | 9/2011 |
| JP | 2015-056323 A | 3/2015 |
| JP | 2015-056324 A | 3/2015 |

* cited by examiner

ENERGY STORAGE APPARATUS

CROSS-REFERENCE TO RELATED APPLICATIONS

This application is based on Japanese Patent Applications No. 2016-032536 filed on Feb. 23, 2016, and 2016-032546 filed on Feb. 23, 2016, the entire contents of which are hereby incorporated by reference.

FIELD

The present invention relates to an energy storage apparatus which includes an outer case.

BACKGROUND

With respect to an energy storage apparatus which includes an outer case and energy storage devices housed in the outer case, there has been known a configuration where a gas discharged from a safety valve which the energy storage device includes is discharged to the outside of the outer case.

For example, an outer case which an energy storage apparatus described in JP-2015-056323 A has a communication portion which makes an internal space and an external space of the outer case communicate with each other and extends in an X-axis direction. The communication portion has a plurality of shield plates which are disposed such that the movement of a substance in the inside of a communication passage in the X axis direction is prevented and the communication between the internal space and the external space by the communication passage is maintained. Since the outer case includes the communication passage in this manner, it is possible to discharge a gas to the outside of the outer case from the inside of the outer case. Further, by disposing the plurality of shield plates in the communication passage, it is possible to prevent the intrusion of foreign substances scattered to the communication portion into the internal space of the outer case.

For example, with respect to an energy storage apparatus which is mounted on a machine, an apparatus or the like used outdoors, when a passage which makes the inside and the outside of an outer case communicate with each other is formed in the outer case, there is a case where water such as rainwater flows into the inside of the passage and flow-in water stagnates in a place in the inside of the outer case. In this case, there is a possibility that functions of constitutional elements which the energy storage apparatus includes are impaired by stagnating water, for example.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus which can efficiently drain water when water flows into the structure provided for ventilation.

According to an aspect of the present invention, there is provided an energy storage apparatus which includes an outer case and an energy storage device housed in the inside of the outer case. The outer case includes a ventilation chamber which makes the inside and the outside of the outer case communicate with each other. The ventilation chamber includes a front wall in which a through hole communicating with the outside is formed, a back wall disposed at a position where the back wall oppsedly faces the front wall, a first wall disposed between the through hole and the back wall, and a first side wall disposed in an extending manner along a first direction which intersects with the front wall with a gap formed between the first side wall and the first wall. The gap is formed over a distance from the front wall to the back wall along the first direction.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
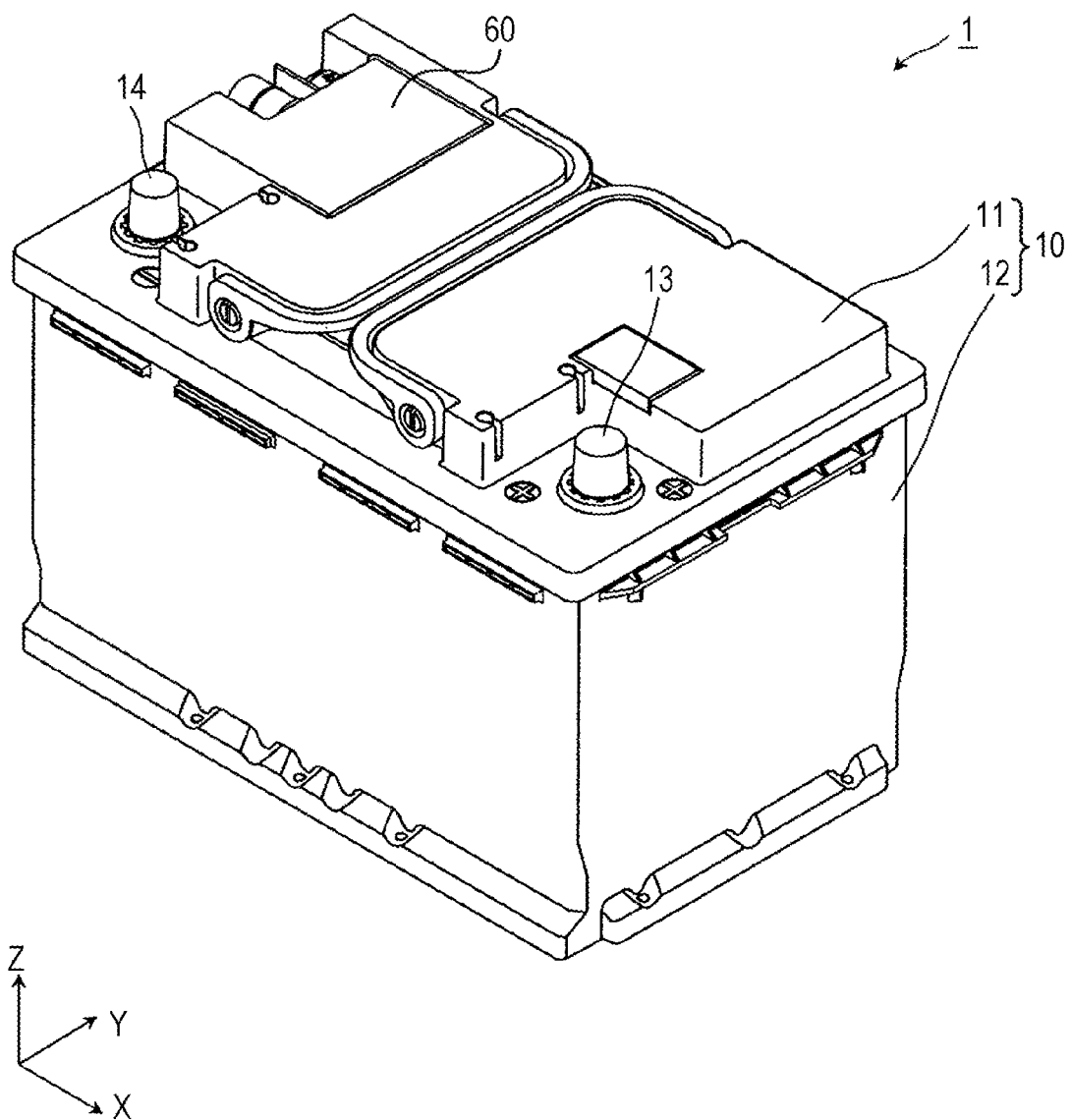
FIG. 1 is a perspective view showing an external appearance of an energy storage apparatus according to an embodiment.

According to an aspect of the present invention, there is provided an energy storage apparatus which includes an outer case, and an energy storage device housed in the inside of the outer case. The outer case includes a ventilation chamber which makes the inside and the outside of the outer case communicate with each other. The ventilation chamber includes a front wall in which a through hole communicating with the outside is formed, a back wall disposed at a position where the back wall opposedly faces the front wall, a first wall disposed between the through hole and the back wall, and a first side wall disposed in an extending manner along a first direction which intersects with the front wall with a gap formed between the first side wall and the first wall. The gap is formed over a distance from the front wall to the back wall along the first direction.

With such a configuration, the outer case includes the ventilation chamber and hence, an excessive elevation of internal pressure of the outer case can be suppressed. By disposing the first wall behind the through hole (the inside of the ventilation chamber), for example, even when water flows into the ventilation chamber through the through hole at a high velocity, energy of water is attenuated by the first wall. As a result, inflow of water into the inside of the outer case through the ventilation chamber can be suppressed. Further, the gap formed over a distance from the front wall to the back wall exists between the first wall and the first side wall and hence, a passage for a fluid is formed along the first direction due to such a gap. Accordingly, even when water flows into the ventilation chamber, drainage of water from the ventilation chamber is promoted.

In this manner, according to one aspect of the present invention, it is possible to provide an energy storage apparatus which can efficiently drain water when water flows into the structure provided for ventilation.

In the energy storage apparatus according to one aspect of the present invention, the ventilation chamber may further include a second wall which is disposed between the first wall and the back wall, and forms the gap between the second wall and the first side wall.

With such a configuration, by further disposing the second wall in the inside of the ventilation chamber, a flow passage for water which flows into the ventilation chamber through the through hole is restricted so that advancing of water toward a deep side of the ventilation chamber can be reduced. A gap which functions as a passage for a fluid exists also between the first side wall and the second wall and hence, favorable drainage is not impaired.

In the energy storage apparatus according to one aspect of the present invention, in the ventilation chamber, a plurality of the second walls may be arranged in a row in the first direction, and the first wall and the plurality of second walls may be disposed such that the first wall and the plurality of respective second walls are shifted from each other in a direction which intersects with the first direction.

With such a configuration, three or more walls exist in the inside of the ventilation chamber and hence, it is possible to enhance an effect of attenuating energy of water which flows into the ventilation chamber through the through hole. To be more specific, three or more walls which provide resistance against a fluid which flows into the ventilation chamber from the outside are disposed in the ventilation chamber, and three or more respective walls which are arranged in a row in the first direction are arranged such that distances between these walls and the first side wall become different from each other alternately, for example. That is, the ventilation chamber has a labyrinth structure where a zig-zag shaped water flow passage is formed. As a result, it is possible to acquire an effect of efficiently lowering energy of water which flows into the ventilation chamber (for example, referred to as "labyrinth effect"). Further, for example, the gap (a passage for a fluid) is formed on both left and right sides of each of three or more walls and hence, drainage of water which flows into the ventilation chamber is enhanced.

In the energy storage apparatus according to one aspect of the present invention, at least a portion of a bottom surface of the ventilation chamber may have a difference in height such that the bottom surface in a vicinity of the through hole is low.

With such a configuration, for example, when water flows into the ventilation chamber, drainage of water through the through hole (drainage of water from ventilation chamber) can be performed more efficiently.

In the energy storage apparatus according to one aspect of the present invention, the outer case may further include a ventilation pipe which is disposed outside the front wall and communicates with the through hole.

With such a configuration, the direction in which a gas is discharged from the outer case is restricted to the axial direction of the ventilation pipe and hence, for example, it is possible to easily design a machine, an apparatus or the like on which the energy storage apparatus is mounted while taking into account the treatment of a discharged gas. Further, the flow of water which advances to the through hole from the outside of the outer case is restricted to the axial direction of the ventilation pipe. Hence, a possibility is reduced that water which flows into the ventilation chamber though the through hole advances to a gap formed between the first wall and the first side wall. That is, it is possible to enhance the effectiveness of the first wall as the member which obstructs the flow of water flowing into the ventilation chamber from the outside.

In the energy storage apparatus according to one aspect of the present invention, a mesh portion where a plurality of through holes are formed may be formed on the front wall.

With such a configuration, a plurality of holes which the mesh portion has respectively function as the through hole for ventilation. Accordingly, it is possible to suppress the entrance of a relatively large foreign substance through the through hole.

In the energy storage apparatus according to one aspect of the present invention, the ventilation chamber may further include an opening portion which is disposed at a position where the opening portion does not overlap with the gap as viewed in a plan view, and communicates with the inside of the outer case.

With such a configuration, a possibility is reduced that water which flows into the ventilation chamber flows into the space in the inside of the outer case where the energy storage device or the like is disposed through the opening portion provided for ventilation.

In the energy storage apparatus according to one aspect of the present invention, the ventilation chamber may further include a waterproof gas permeable film which covers the opening portion.

With such a configuration, even when water which flows into the ventilation chamber reaches the position of the opening portion, it is possible to prevent the intrusion of water into the inside of the outer case through the opening portion by the waterproof gas permeable film.

The present invention can be realized not only in the form of such an energy storage apparatus but also in the form of the outer case which the energy storage apparatus according to any one of the above-mentioned aspects of the present invention includes.

According to the energy storage apparatus of the present invention, when water flows into the structure provided for ventilation, it is possible to efficiently drain such water.

The outer case which the energy storage apparatus described in JP 2015-056324 A has includes an opening portion which makes an internal space and an external space of an outer case communicate with each other, and the opening portion is closed by the use of both of a functional film and a waterproof film. With such a configuration, the intrusion of water into the inside of the outer case from the communication portion can be prevented, and a gas generated when an unusual state occurs can be discharged through the communication portion while decreasing a stress applied to the outer case.

In the above-mentioned energy storage apparatus according to the prior art, for example, it is necessary to prevent the formation of a gap between two films disposed in parallel at the opening portion of the outer case and hence, there is a possibility that the structure or the manufacturing steps of the outer case becomes complicated.

Accordingly, it is another object of the present invention to provide an energy storage apparatus which can realize a function of providing ventilation between the inside and the outside of an outer case with the simple structure or the simple manufacturing steps.

To achieve the above-mentioned object, according to another aspect of the present invention, there is provided an energy storage apparatus which includes an outer case having a first opening portion and a second opening portion which communicate with the outside respectively. The energy storage apparatus further includes a first member which covers the first opening portion and has waterproofness and gas permeability, and a second member which covers the second opening portion, and is configured to release pressure in the inside of the outer case when the pressure in the inside of the outer case exceeds a predetermined pressure.

According to another aspect of the present invention, there is provided an energy storage apparatus which includes an outer case having a lid and a container. The lid includes a lower lid which covers an opening of the container, an upper lid disposed over the lower lid, and a second side wall which connects the lower lid and the upper lid to each other. A ventilation chamber is formed of the lower lid, the upper lid, and the second side wall. A through hole which makes the outside and the ventilation chamber communicate with each other is formed in the second side wall. The lower lid includes a first opening portion and a second opening portion which make the inside of the container and the ventilation chamber communicate with each other, a first member which covers the first opening portion and has waterproofness and gas permeability, and a second member which covers the second opening portion and releases pressure in the inside of the outer case when the pressure in the inside of the outer case exceeds a predetermined pressure.

With the above-mentioned respective configurations, the members having different functions are disposed on two opening portions which the outer case includes respectively. Accordingly, it is possible to provide two opening portions with different functions (for example, a pressure equalizing function during a normal operation and a gas discharging function at the time of occurrence of an unusual state (in emergency)). That is, it is possible to provide the respective opening portions with different functions with the relatively simple structure or relatively simple manufacturing steps.

According to the above-mentioned aspects of the present invention, it is possible to provide the energy storage apparatus which can realize a function of providing ventilation between the inside and the outside of the outer case with the simple structure or simple manufacturing steps.

In the energy storage apparatus according to the above-mentioned another aspect of the present invention, the outer case may include a ventilation chamber where at least one of the first opening portion and the second opening portion and a through hole which communicates with the outside are disposed. The at least one of the first opening portion and the second opening portion may be disposed at a position where the at least one of the first opening portion and the second opening portion communicate with the outside through the through hole. Assuming a direction of an axis of the first opening portion as a first axial direction, a direction of an axis of the second opening portion as a second axial direction, and a direction of an axis of the through hole as a third axial direction, at least one of the first axial direction and the second axial direction may intersect with the third axial direction.

With such a configuration, a gas which flows into the ventilation chamber through the opening portion is discharged to the outside of the outer case through the through hole which the ventilation chamber has. Further, even when water flows into the ventilation chamber through the through hole at high velocity, since the axial direction of the through hole and the axial direction of the opening portion disposed in the ventilation chamber intersect with each other, structurally, a possibility is reduced that water advances toward the opening portion from the axial direction of the opening portion. As a result, a possibility of intrusion of water into the inside of the outer case through the opening portion is reduced.

In the energy storage apparatus according to another aspect of the present invention, the outer case may include a ventilation chamber where at least one of the first opening portion and the second opening portion and a through hole which communicate with the outside are disposed. The at least one of the first opening portion and the second opening portion may be disposed at a position where the at least one of the first opening portion and the second opening portion communicate with the outside through the through hole. Assuming an axis of the first opening portion as a first axis, an axis of the second opening portion as a second axis, and an axis of the through hole as a third axis, at least one of the first axis and the second axis may be parallel to the third axis.

With such a configuration, a gas which flows into the ventilation chamber through the opening portion is discharged to the outside of the outer case through the through hole which the ventilation chamber has. Further, even when water flows into the ventilation chamber through the through hole at high velocity, since the axis of the through hole and the axis of the opening portion are parallel to each other (not overlapping in a three-dimensional space), structurally, a possibility is reduced that water advances toward the opening portion from the axial direction of the opening portion. As a result, a possibility of intrusion of water into the inside of the outer case through the opening portion is reduced.

In the energy storage apparatus according to one aspect of the present invention, at least a portion of a bottom surface of the ventilation chamber may have a difference in height such that the bottom surface in a vicinity of the through hole is low.

With such a configuration, for example, when water flows into the ventilation chamber, drainage of water through the through hole (drainage of water from ventilation chamber) can be performed more efficiently.

In the energy storage apparatus according to one aspect of the present invention, the ventilation chamber may include: a first ventilation chamber where at least one of the first opening portion and the second opening portion is disposed; and a second ventilation chamber where the through hole is disposed.

With such a configuration, in the ventilation chamber, the through hole and at least one of the first opening portion and the second opening portion are disposed in different compartments. Accordingly, a possibility that water flowing into the ventilation chamber through the through hole reaches at least one of the first opening portion and the second opening portion is reduced. That is, a possibility that water intrudes into the inside of the outer case through the first opening portion or the second opening portion can be reduced.

In the energy storage apparatus according to one aspect of the present invention, the outer case may further include a ventilation pipe which is disposed outside the through hole and communicates with the through hole.

With such a configuration, the direction in which a gas is discharged from the outer case is restricted to the axial direction of the ventilation pipe and hence, for example, it is possible to easily design a machine, an apparatus or the like on which the energy storage apparatus is mounted while taking into account the treatment of a discharged gas.

In the energy storage apparatus according to one aspect of the present invention, the ventilation chamber may have both the first opening portion and the second opening portion, and the first member may be disposed at a position remoter from the through hole than the second member in the ventilation chamber.

With such a configuration, for example, water which flows into the ventilation chamber from the outside through the through hole minimally reaches the first member. As a result, a possibility that water intrudes into the inside of the outer case through the first opening portion is reduced. To be more specific, for example, a possibility that intrusion of water or the like through the first member occurs due to soaking of the first member in water can be reduced.

In the energy storage apparatus according to one aspect of the present invention, the ventilation chamber may have both the first opening portion and the second opening portion, and is positioned above a bottom surface of the outer case, and the first member may be positioned higher than the second member in the ventilation chamber.

With such a configuration, in a posture which the energy storage apparatus assumes when the energy storage apparatus is used in a normal mode, the first member having higher gas permeability than the second member exists at a relatively high position. Accordingly, for example, even when outside water flows into the ventilation chamber, a possibility that intrusion of water or the like through the first member occurs due to soaking of the first member in water can be reduced.

In the energy storage apparatus according to one aspect of the present invention, the first member may be a sheet-like member and may be bonded to a periphery of the first opening portion, and the second member may be a sheet-like member and may be bonded to a periphery of the second opening portion.

With such a configuration, the first member and the second member can be disposed relatively easily respectively.

In the energy storage apparatus according to one aspect of the present invention, the second member may include: a relief valve portion bonded to the periphery of the second opening portion; and a fixed portion connected to the relief valve portion and fixed to a portion outside the periphery of the second opening portion.

With such a configuration, for example, even when the relief valve portion is peeled off so that the second opening portion is opened due to the sharp elevation of internal pressure of the outer case, the second member is held or retained at a predetermined position by the fixing portion. Accordingly, a possibility that the second member obstructs the discharge of a gas to the outside from the inside of the outer case, for example, is reduced.

In the energy storage apparatus according to one aspect of the present invention, mounting strength of the second member on the second opening portion may be lower than mounting strength of the first member on the first opening portion.

With such a configuration, the second member exhibits low mounting strength and hence, the second member is easily removed. Accordingly, for example, when internal pressure of the outer case is sharply increased, the effectiveness of the second member having a function of releasing the internal pressure is enhanced.

The present invention can be realized not only in the form of such an energy storage apparatus but also in the form of the outer case which the energy storage apparatus according to any one of the above-mentioned aspects of the present invention includes.

According to the energy storage apparatus of the present invention, it is possible to provide the energy storage apparatus which can realize a function of providing ventilation between the inside and the outside of the outer case with the simple structure or simple manufacturing steps.

Hereinafter, energy storage apparatuses according to embodiments of the present invention are described with reference to drawings. The embodiments and modifications described hereinafter are one specific example of the present invention. In the embodiments described hereinafter, numerical values, shapes, materials, constitutional elements, the arrangement positions and connection states of the constitutional elements, respective steps in the manufacturing method, the order of the steps and the like are merely examples, and these are not intended to be used for limiting the present invention. Further, out of the constitutional elements in the embodiments and the modifications described hereinafter, the constitutional elements which are not described in independent claims describing an uppermost concept are described as arbitrary constitutional elements.

Respective views in the attached drawings are schematic views and are not always described strictly accurately. In the respective drawings, constitutional elements identical to each other or similar to each other are given the same symbols. In the following description of the embodiment, there may be cases where expressions which contain "approximately" such as "approximately half" and "approximately horizontal" are used. For example, "approximately horizontal" means not only a completely horizontal state but also a substantially horizontal state. That is, the term "approximately" includes also approximately several % of tolerance, for example. The same goes for other expressions which contain "approximately".

Embodiment

First, a configuration of an energy storage apparatus 1 according to an embodiment is described.

Figure 2:
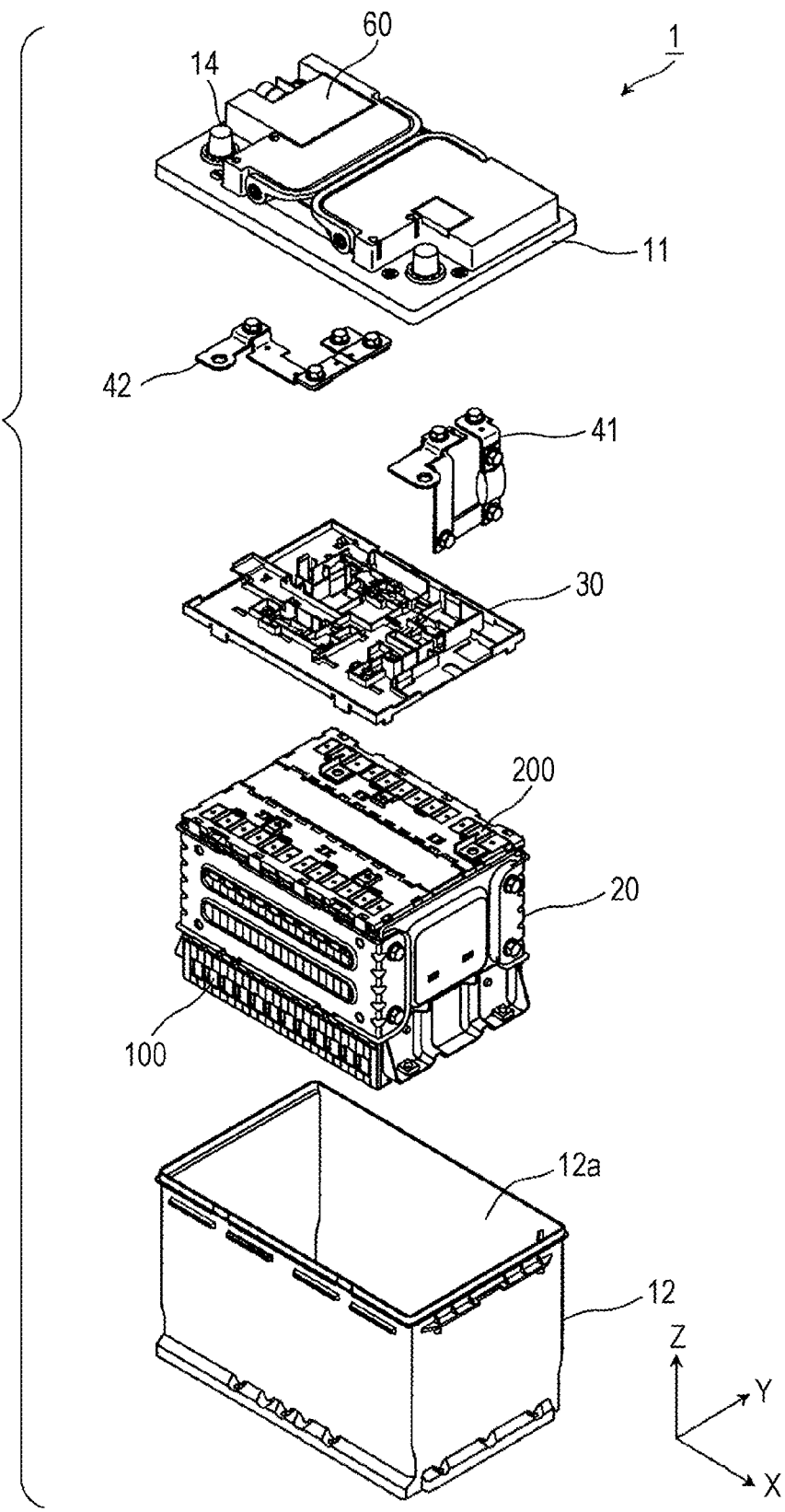
FIG. 2 is an exploded perspective view showing respective constitutional elements of the energy storage apparatus according to the embodiment in a disassembled state.

FIG. 1 is a perspective view showing an external appearance of the energy storage apparatus 1 according to the embodiment. FIG. 2 is an exploded perspective view showing respective constitutional elements of the energy storage apparatus 1 according to the embodiment in a disassembled state.

In these drawings, the Z axis direction is indicated as the vertical direction, and the description is made hereinafter using the Z axis direction as the vertical direction. However, there may also be a case where the Z axis direction is not the vertical direction depending on a mode of use and hence, the Z axis direction is not limited to the vertical direction. The same goes for drawings which are referenced hereinafter.

The energy storage apparatus 1 is an apparatus which can charge electricity from the outside of the energy storage apparatus 1 therein or can discharge electricity to the outside of the energy storage apparatus 1. For example, the energy storage apparatus 1 is a battery module used for power storage application, power source application or the like. To be more specific, the energy storage apparatus 1 is used as an engine starting battery for a mobile body such as an automobile, a motorcycle, a water craft, a snowmobile, an agricultural machine or a construction machine, for example. Further, the energy storage apparatus 1 can supply electricity to an external load singly (in a single form) or can be charged from an external power source singly (in a single form). That is, although there exists a configuration where a plurality of battery modules (energy storage apparatuses) are connected to each other and are housed in a case thus forming a battery pack as a driving power source for an electric vehicle, a plug-in hybrid electric vehicle and the like, the energy storage apparatus 1 of this embodiment has a configuration different from such a configuration. Further, a battery pack may be configured by electrically connecting the plurality of energy storage apparatuses 1 to each other corresponding to an external load or an external power source.

As shown in FIG. 1 and FIG. 2, the energy storage apparatus 1 according to this embodiment includes: an outer case 10 having a lid 11 and a container 12; and an energy storage unit 20, a holder 30, bus bars 41, 42 and the like which are housed in the outer case 10.

The outer case 10 is a structure having a rectangular shape (box shape) which forms an outer case of the energy storage apparatus 1. That is, the outer case 10 is disposed outside the energy storage unit 20, the holder 30 and the bus bars 41, 42, and allows the energy storage unit 20 and the like to be disposed at predetermined positions in the outer case 10 thus protecting the energy storage unit 20 and the like from an impact or the like. For example, the outer case 10 is made of an insulating resin material such as polycarbonate (PC), polypropylene (PP), polyethylene (PE), a polyphenylene sulfide resin (PPS), polybutylene terephthalate (PBT) or an ABS resin. Accordingly, the outer case 10 prevents the energy storage unit 20 and the like from coming into contact with a metal member or the like disposed outside the outer case 10.

The lid 11 which the outer case 10 includes is a cover member having a flat rectangular shape which closes an opening 12a of the container 12, and a positive electrode external terminal 13 and a negative electrode external terminal 14 are mounted on the lid 11. The energy storage apparatus 1 charges electricity from the outside therein or discharges electricity to the outside through the positive electrode external terminal 13 and the negative electrode external terminal 14. The container 12 is a bottomed rectangular cylindrical housing having the opening, and houses the energy storage unit 20, the holder 30, the bus bars 41, 42 and the like.

The lid 11 and the container 12 may be made of the same material, or may be made of different materials. Electric equipment such as a printed circuit board and a relay is disposed in the inside of the lid 11. However, the illustration and description of such electric equipment are omitted.

In this embodiment, the outer case 10 has the structure which allows a gas to move between the inside and the outside of the outer case 10 and prevents water from flowing into the inside of the outer case 10 from the outside. That is, the outer case 10 has the structure which makes the inside and the outside of the outer case 10 communicate with each other. With such a structure, a gas in the outer case 10 can be discharged to the outside of the outer case 10. Further, a gas outside the outer case 10 can be taken into the inside of the outer case 10. The structure provided for such ventilation is described later with reference to FIG. 4 to FIG. 8.

The energy storage unit 20 includes a plurality of energy storage devices 100 (twelve energy storage devices 100 in this embodiment) and a plurality of bus bars 200, and is electrically connected to the positive electrode external terminal 13 and the negative electrode external terminal 14 mounted on the lid 11. That is, a positive electrode terminal of any one of the plurality of energy storage devices 100 is electrically connected to the positive electrode external terminal 13 through the bus bars 200. A negative electrode terminal of any one of the plurality of energy storage devices 100 is electrically connected to the negative electrode external terminal 14 through the bus bars 200.

The energy storage unit 20 is disposed in the inside of the container 12 such that the plurality of energy storage devices 100 are arranged in a row in the X axis direction in a state where each energy storage device 100 is mounted vertically. The energy storage unit 20 is housed in the outer case 10 while being covered by the lid 11 from above. The detailed configuration of the energy storage unit 20 is described later.

The holder 30 is an electric component tray which holds electric components such as the bus bars 41, 42 and other relays, and wirings (not shown in the drawing), can provide insulation between the bus bars 41, 42 and the like and other members, and can regulate positions of the bus bars 41, 42 and the like. Particularly, the holder 30 performs the positioning of the bus bars 41, 42 with respect to the bus bars 200 disposed in the energy storage unit 20, the positive electrode external terminal 13 and the negative electrode external terminal 14.

To be more specific, the holder 30 is mounted on an upper side (a plus side in the Z axis direction) of the energy storage unit 20 and is positioned with respect to the energy storage unit 20. The bus bars 41, 42 are mounted on the holder 30 and are positioned with respect to the holder 30. The lid 11 is disposed on the holder 30. With such a configuration, the bus bars 41, 42 are positioned with respect to the bus bars 200 disposed in the energy storage unit 20 and the positive electrode external terminal 13 and the negative electrode external terminal 14 mounted on the lid 11.

The holder 30 is made of an insulating resin material such as PC, PP, PE, PPS, PBT or an ABS resin, for example. However, the holder 30 may be made of any material provided that the holder 30 is made of a material having insulating property.

The bus bars 41, 42 electrically connect the bus bars 200 disposed in the energy storage unit 20 and the positive electrode external terminal 13 and the negative electrode external terminal 14 mounted on the lid 11 to each other. That is, the bus bar 41 is a conductive member which electrically connects the bus bar 200 disposed on one end in the energy storage unit 20 and the positive electrode external terminal 13 to each other. The bus bar 42 is a conductive member which electrically connects the bus bar 200 disposed on the other end in the energy storage unit 20 and the negative electrode external terminal 14 to each other.

The bus bars 41, 42 are conductive members made of copper, for example.

However, materials for forming the bus bars 41, 42 are not particularly limited. The bus bars 41, 42 may be made of the same material or different materials.

Next, the configuration of the energy storage unit 20 is described in detail.

Figure 3:
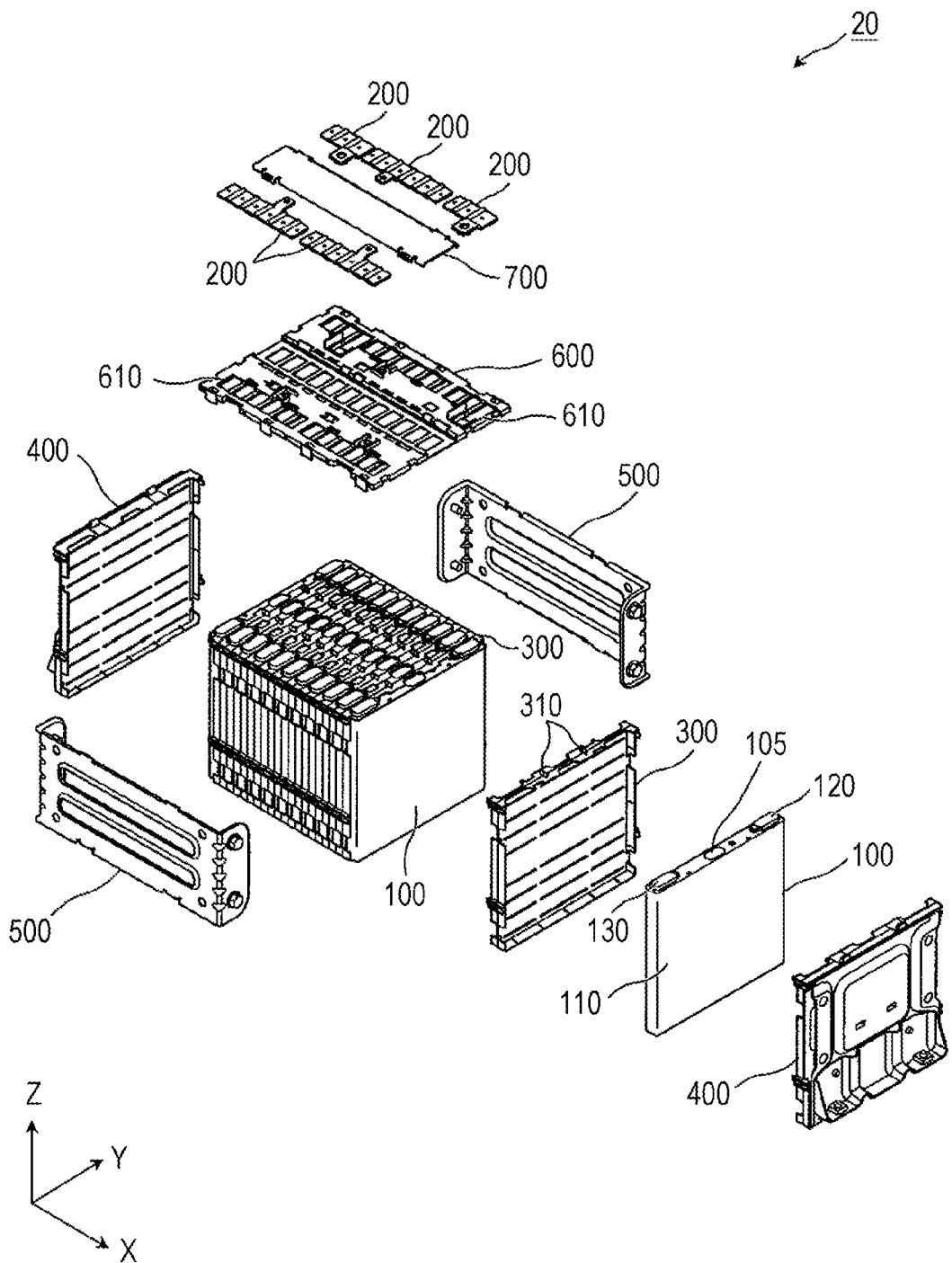
FIG. 3 is an exploded perspective view showing respective constitutional elements of an energy storage unit according to the embodiment in a disassembled state.

FIG. 3 is an exploded perspective view showing respective constitutional elements of the energy storage unit 20 according to the embodiment in a disassembled state.

As shown in the drawing, the energy storage unit 20 includes: the plurality of energy storage devices 100; the plurality of bus bars 200; a plurality of spacers 300; a pair of sandwiching members 400; a plurality of binding members 500; a bus bar frame 600; and a heat shielding plate 700.

The energy storage device 100 is a secondary battery (battery) which can charge or discharge electricity. To be more specific, the energy storage device 100 is a nonaqueous electrolyte secondary battery such as a lithium ion secondary battery. The energy storage device 100 has a flat rectangular shape, and is disposed adjacently to the spacer 300. That is, the plurality of energy storage devices 100 and the plurality of spacers 300 are arranged in a row in the X axis direction such that the energy storage device 100 and the spacer 300 are alternately arranged. In this embodiment, twelve energy storage devices 100 and eleven spacers 300 are arranged such that the energy storage device 100 and the spacer 300 are arranged alternately and adjacently to each other. The energy storage device 100 is not limited to a nonaqueous electrolyte secondary battery, and may be a secondary battery other than a nonaqueous electrolyte secondary battery, or may be a capacitor.

As shown in the drawing, each energy storage device 100 includes a case 110, a positive electrode terminal 120 and a negative electrode terminal 130. An electrode assembly (power generating element), current collectors (a positive electrode current collector and a negative electrode current collector) and the like are disposed in the inside of the case 110, and an electrolyte solution (nonaqueous electrolyte) or the like is sealed in the case 110. However, the detailed description of such a configuration is omitted.

The case 110 is formed of: a bottomed case body made of metal and having a rectangular cylindrical shape; and a metal-made lid plate which closes an opening of the case body. The case 110 has a structure where the inside of the case 110 is hermetically sealed by bonding the lid plate and the case body to each other by welding or the like after the electrode assembly and the like are housed in the inside of the case 110. As described above, the case 110 is a rectangular parallelepiped container having the lid plate disposed on a plus side in the Z axis direction in the drawing, long side surfaces disposed on side surfaces of the container on both sides in the X axis direction, short side surfaces disposed on side surfaces of the container on both sides in the Y axis direction, and a bottom surface disposed on a minus side in the Z axis direction. Although a material for forming the case 110 is not particularly limited, it is preferable that the case 110 be made of weldable metal such as stainless steel, aluminum or an aluminum alloy, for example.

A safety valve 105 is mounted on the lid plate of the case 110. The safety valve 105 is provided to each energy storage device 100 as a safety mechanism which is opened when an internal pressure in the case 110 is increased thus releasing a gas in the case 110. The structure of the plurality of energy storage devices 100 which the energy storage apparatus 1 includes is not limited the structure where all of the plurality of energy storage devices 100 are provided with the safety valve 105 respectively. It is sufficient that at least one energy storage device 100 be provided with the safety valve 105.

The positive electrode terminal 120 is an electrode terminal electrically connected to a positive electrode of an electrode assembly through a positive electrode current collector. The negative electrode terminal 130 is an electrode terminal electrically connected to a negative electrode of the electrode assembly through a negative electrode current collector. Both the positive electrode terminal 120 and the negative electrode terminal 130 are mounted on the lid plate of the case 110. That is, the positive electrode terminal 120 and the negative electrode terminal 130 are metal-made electrode terminals through which electricity stored in the electrode assembly is discharged to the outside of the energy storage device 100, and through which electricity is introduced into the inside of the energy storage device 100 for storing electricity in the electrode assembly. In this embodiment, the energy storage devices 100 are disposed in a state where the positive electrode terminals 120 and the negative electrode terminals 130 are directed upward.

The bus bars 200 are conductive members electrically connected to the plurality of respective energy storage devices 100 in the energy storage unit 20. That is, the bus bars 200 are conductive members electrically connected to the respective electrode terminals which the plurality of energy storage devices 100 include. To be more specific, the bus bars 200 are disposed on surfaces of the respective electrode terminals which the plurality of respective energy storage devices 100 include, and are connected (bonded) to the electrode terminals.

In this embodiment, five bus bars 200 are disposed on the energy storage devices 100. Twelve energy storage devices 100 are disposed such that four sets of energy storage devices 100 each set of which is formed of three energy storage devices 100 connected in parallel are connected in series by five bus bars 200. The bus bars 200 disposed on end portions of the energy storage unit 20 are connected to the bus bars 41, 42 described above so that the bus bars 200 are electrically connected to the positive electrode external terminal 13 and the negative electrode external terminal 14.

The bus bars 200 are conductive members made of aluminum, for example. However, a material for forming the bus bars 200 is not particularly limited. All bus bars 200 may be made of the same material, or some bus bars 200 may be made of a material different from a material used for forming other bus bars 200. The number of bus bars 200, the number of energy storage devices 100 connected in parallel, the number of sets of the energy storage devices 100 connected in series and the like are not limited to the above-mentioned numbers.

The spacer 300 is a plate-like member disposed on a side of the energy storage device 100 (the plus side or the minus side in the X axis direction), and providing insulation between the energy storage device 100 and other members. The spacer 300 is made of an insulating resin such as PC, PP, PE, PPS, PBT or an ABS resin, for example. That is, the spacer 300 is arranged between two energy storage devices 100 disposed adjacently to each other, and provides insulation between two energy storage devices 100. In this embodiment, twelve energy storage devices 100 and eleven spacers 300 are arranged in a row such that the spacer 300 is disposed between two energy storage devices 100 disposed adjacently to each other. The spacers 300 may be made of any material provided that the spacers 300 are made of a material having insulating property. All of the spacers 300 may be made of the same material, or some spacers 300 may be made of a material different from a material for forming other spacers.

The spacer 300 is formed such that the spacer 300 covers approximately half on a front surface side or a back surface side of the energy storage device 100 (an approximately half on the front surface side or the back surface side of the energy storage device 100 when the energy storage device 100 is divided in two in the X axis direction). That is, a recessed portion is formed on both surfaces (both surfaces in the X axis direction) of the spacer 300 on the front surface side and the back surface side respectively, and an approximately half of the energy storage device 100 is inserted into each recessed portion. With such a configuration, the spacers 300 disposed on sides of the energy storage device 100 cover the most part of the energy storage device 100. Accordingly, insulating property between the energy storage devices 100 and other conductive members can be enhanced by the spacers 300.

The spacer 300 has spacer projecting portions 310 which project upward and are engageable with the holder 30. With such a configuration, even when the holder 30 intends to move upward, an upward movement of the holder 30 is suppressed by the spacer projecting portions 310 of the spacer 300.

The sandwiching members 400 and the binding members 500 are members which press the energy storage devices 100 from the outside in the stacking direction of the electrode assembly of the energy storage device 100. That is, the sandwiching members 400 and the binding members 500 sandwich the plurality of energy storage devices 100 from both sides in the stacking direction thus pressing each energy storage device 100 included in the plurality of respective energy storage devices 100 from both sides. The stacking direction of the electrode assembly of the energy storage device 100 means the direction in which a positive electrode, a negative electrode and separators of the electrode assembly are stacked, and is equal to the direction (X axis direction) in which the plurality of energy storage devices 100 are arranged in a row. That is, the plurality of energy storage devices 100 are arranged in a row in the stacking direction.

To be more specific, the sandwiching members 400 are flat plate-like members (end plates) disposed on both sides of the unit formed of the plurality of energy storage devices 100 in the X axis direction respectively. The sandwiching members 400 hold the plurality of energy storage devices 100 and the plurality of spacers 300 by sandwiching the plurality of energy storage devices 100 and the plurality of spacers 300 from both sides in the arrangement direction (X axis direction) of the unit formed of the plurality of energy storage devices 100 and the plurality of spacers 300. The sandwiching member 400 is made of a metal (conductive) material such as steel or stainless steel, for example, from a viewpoint of strength or the like of the sandwiching members 400. However, a material for forming the sandwiching member 400 is not limited to a metal material, and may be made of an insulating material having high strength, for example. When the sandwiching member 400 is made of a conductive material, a member having insulating property in the same manner as the spacer 300 is disposed between the sandwiching member 400 and the energy storage device 100 for ensuring insulating property between the sandwiching member 400 and the energy storage device 100.

The binding members 500 are elongated flat-plate-like members (binding bars) each of which has both ends thereof mounted on the sandwiching members 400, and binds the plurality of energy storage devices 100 to each other. That is, the binding members 500 are disposed so as to straddle over the plurality of energy storage devices 100 and the plurality of spacers 300 thus applying a binding force in the arrangement direction (X axis direction) of these members to the plurality of energy storage devices 100 and the plurality of spacers 300.

In this embodiment, two binding members 500 are disposed on both sides (both sides in the Y axis direction) of the unit formed of the plurality of energy storage devices 100, and two binding members 500 bind the plurality of energy storage devices 100 to each other by sandwiching the unit formed of the plurality of energy storage devices 100 from both sides. In the same manner as the sandwiching members 400, the binding members 500 are preferably made of a metal material such as steel or stainless steel, for example. However, the binding members 500 may be made of a material other than metal.

The bus bar frame 600 is a member which can provide insulation between the bus bars 200 and other members, and can regulate the positions of the bus bars 200. Particularly, the bus bar frame 600 performs the positioning of the bus bars 200 with respect to the plurality of energy storage devices 100 in the energy storage unit 20.

To be more specific, the bus bar frame 600 is placed on an upper side (a plus side in the Z axis direction) of the unit formed of the plurality of energy storage devices 100, and is positioned with respect to the plurality of energy storage devices 100. The bus bars 200 are placed on the bus bar frame 600, and are positioned with respect to the bus bar frame 600. With such a configuration, the bus bars 200 are positioned with respect to the plurality of energy storage devices 100, and the bus bars 200 are bonded to electrode terminals which the plurality of respective energy storage devices 100 include through bus-bar-use opening portions 610 which are through holes formed in the bus bar frame 600.

The bus bar frame 600 is made of an insulating resin material such as PC, PP, PE, PPS, PBT or an ABS resin, for example. However, the bus bar frame 600 may be made of any material provided that the bus bar frame 600 is made of a material having insulating property. In this embodiment, it is preferable that the bus bar frame 600 be made of a material having relatively high rigidity (a material having higher rigidity than holder 30) for ensuring a function of fixing the holder 30 to the energy storage devices 100.

The heat shielding plate 700 is a plate-like member having heat insulating property which is disposed in a flow passage for a gas discharged from the safety valve 105 of each energy storage device 100. To be more specific, the heat shielding plate 700 is disposed on the bus bar frame 600 such that the heat shielding plate 700 is positioned above the safety valves of the respective energy storage devices 100. In this embodiment, the respective safety valves 105 of the plurality of energy storage devices 100 are arranged on a straight line extending along the X axis direction. The heat shielding plate 700 is positioned above the respective safety valves 105, and has an elongated shape extending in the X axis direction.

When an unusual state occurs such as a case where a gas is discharged from the safety valve of the energy storage device 100, for example, the heat shielding plate 700 protects electric equipment such as a printed circuit board disposed above the energy storage unit 20 from heat of the gas. Through holes (described later with reference to FIG. 5 and the like) which make the inside and the outside of the outer case 10 communicate with each other are formed in the outer case 10 so that a gas which impinges on the heat shielding plate 700 is introduced into the outside of the outer case 10 through the through holes.

In this embodiment, the heat shielding plate 700 is made of a metal material having low thermal conductivity such as stainless steel. However, a material for forming the heat shielding plate 700 is not limited to such a metal material, and any material having high heat resistance and low thermal conductivity can be used. For example, the heat shielding plate 700 may be made of a resin such as PPS or PBT reinforced with glass fibers, ceramic or the like.

With respect to the energy storage apparatus 1 having the above-mentioned configuration, the structure for discharging a gas released from one or more energy storage devices 100 to the outside of the outer case 10 is described with reference to FIG. 4 to FIG. 8.

Figure 4:
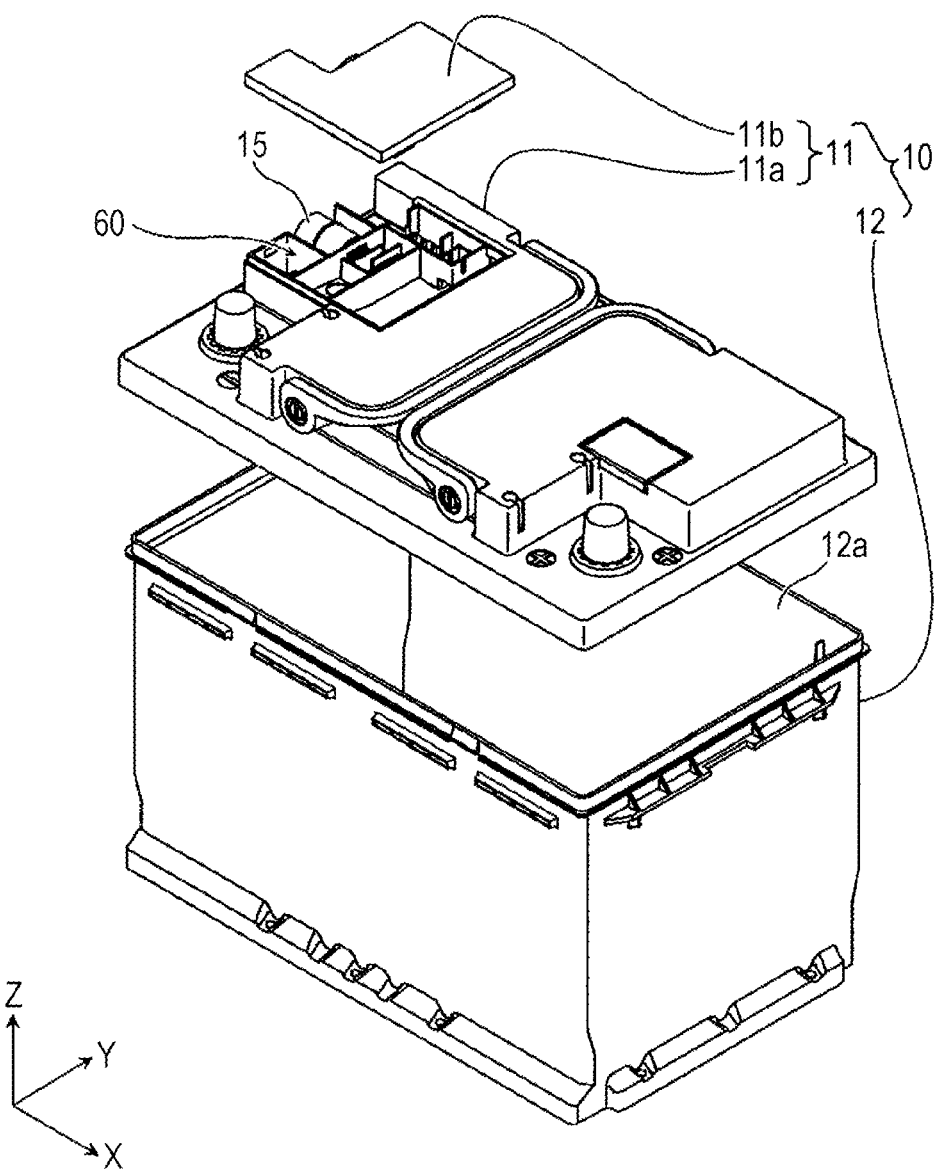
FIG. 4 is an exploded perspective view showing a schematic configuration of an outer case according to the embodiment.

FIG. 4 is an exploded perspective view showing a schematic configuration of the outer case 10 according to the embodiment. To be more specific, in FIG. 4, the outer case 10 is illustrated in a state where the lid 11 and the container 12 are separated from each other, and the lid 11 is divided into a lower lid 11a and an upper lid 11b. The illustration of other elements such as the plurality of energy storage devices 100 which are housed in the inside of the outer case 10 is omitted.

Figure 5:
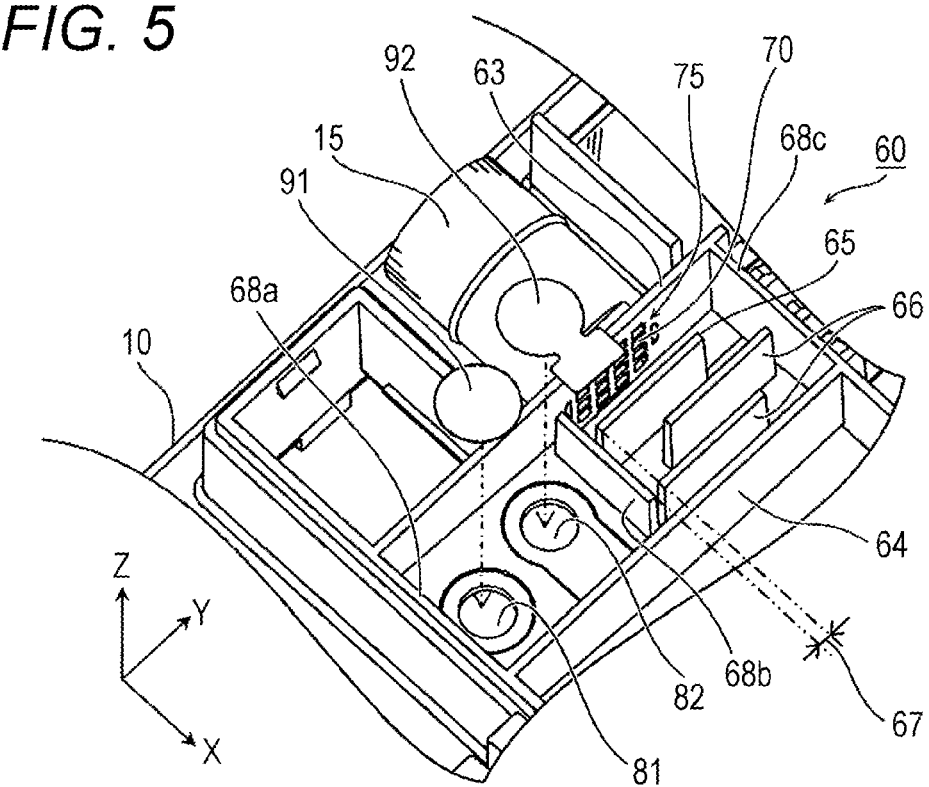
FIG. 5 is a partially enlarged perspective view showing a schematic configuration of a ventilation chamber which the outer case according to the embodiment includes.
Figure 6:
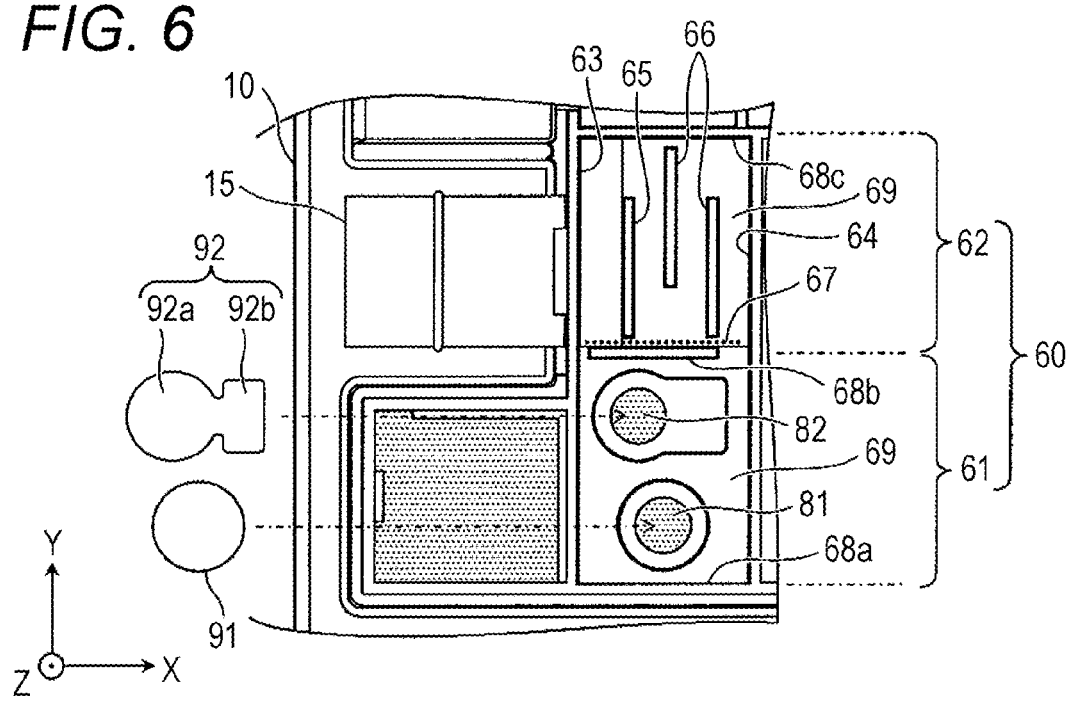
FIG. 6 is a plan view which corresponds to FIG. 5.

FIG. 5 is a partially enlarged perspective view showing a schematic configuration of the ventilation chamber 60 which the outer case 10 according to the embodiment includes. FIG. 6 is a plan view which corresponds to FIG. 5. In FIG. 5 and FIG. 6, the illustration of the upper lid 11b is omitted, and a first member 91 and a second member 92 are illustrated in a state where the first member 91 and the second member 92 are separated from the ventilation chamber 60. In FIG. 6, regions of the lower lid 11a where an opening is formed in a penetrating manner are indicated by a dotted pattern such that these regions can be easily distinguished from other constitutional elements.

As shown in FIG. 4 to FIG. 6, the outer case 10 according to this embodiment includes the ventilation chamber 60 which makes the inside and the outside of the outer case 10 communicate with each other. The ventilation chamber 60 includes: a front wall 63 in which the through holes 70 communicating with the outside of the outer case 10 are formed; a back wall 64 disposed at a position where the back wall 64 opposedly faces the front wall 63; a first wall 65 disposed between the through holes 70 and the back wall 64; and a first side wall 68b disposed in an extending manner along the first direction which intersects with the front wall 63 with a gap 67 formed between the first side wall 68b and the first wall 65.

In this embodiment, the front wall 63 is disposed in a posture such that the front wall 63 is parallel to the Y axis direction. The first direction agrees with the X axis direction. In this embodiment, as shown in FIG. 6, for example, the gap 67 (indicated by a bold dotted line in FIG. 6) is formed along the first direction over an area ranging from the front wall 63 to the back wall 64. When viewed in entirety, the gap 67 is a straight-line space through which a fluid can pass. Accordingly, the gap 67 can also be referred to as a passage for a fluid, a straight-line passage for a fluid or the like.

In this embodiment, as shown in FIG. 5 and FIG. 6, the ventilation chamber 60 has three side walls (a first side wall 68a, and second side walls 68b, 68c) which extend in the X axis direction and are arranged parallel to each other in the Y axis direction. The second side walls 68a and 68c disposed on both ends in the Y axis direction form walls of the ventilation chamber 60 at both ends in the Y axis direction.

A bottom surface 69 (a portion of the lower lid 11a) and the upper lid 11b form walls of the ventilation chamber 60 in the Z axis direction (vertical direction). That is, the ventilation chamber 60 is a space provided for ventilation (ventilation space) which is surrounded by the second side walls 68a and 68c, the front wall 63, the back wall 64, the bottom surface 69 and the upper lid 11b.

The front wall 63 and the back wall 64 may also be respectively referred to as walls on sides (that is, second side walls) of the ventilation chamber 60 in the X axis direction.

In such a configuration, opening portions communicating with the outside of the outer case 10 are formed in the ventilation chamber 60. To be more specific, the first opening portion 81 and the second opening portion 82 are formed in the ventilation chamber 60. The first opening portion 81 and the second opening portion 82 respectively communicate with the outside of the outer case 10 through the through holes 70.

That is, the energy storage apparatus 1 according to this embodiment includes the outer case 10 having the first opening portion 81 and the second opening portion 82 which respectively communicate with the outside of the outer case 10. The energy storage apparatus 1 further includes: the first member 91 which covers the first opening portion and has waterproofness and gas permeability; and the second member 92 which covers the second opening portion 82 and releases pressure in the inside of the outer case 10 when the pressure in the inside of the outer case 10 exceeds a predetermined pressure.

The energy storage apparatus 1 can also be expressed as follows. The energy storage apparatus 1 includes the outer case 10 having the lid 11 and the container 12, wherein the lid 11 includes: the lower lid 11a which covers the opening 12a of the container 12; the upper lid 11b which is disposed over the lower lid 11a; and second side walls such as the second side wall 68a which connect the lower lid 11a and the upper lid 11b to each other. The ventilation chamber 60 is formed of the lower lid 11a, the upper lid 11b and the second side walls such as the second side wall 68a. The through holes 70 which make the outside of the outer case 10 and the ventilation chamber 60 communicate with each other are formed in one second side wall. The lower lid 11a includes: the first opening portion 81 and the second opening portion 82 which make the inside of the container 12 and the ventilation chamber 60 communicate with each other; the first member 91 which covers the first opening portion 81 and has waterproofness and gas permeability; and the second member 92 which covers the second opening portion 82 and releases pressure in the inside of the outer case 10 when the pressure in the inside of the outer case 10 exceeds a predetermined pressure.

As described above, the outer case 10 has two opening portions (the first opening portion 81 and the second opening portion 82), and members (the first member 91 and the second member 92) having different functions are disposed on the opening portions respectively. Hence, it is possible to provide the opening portions with different functions respectively. In this embodiment, simply speaking, the removal of a gas from the outer case 10 during a normal operation is performed through the first opening portion 81, while the removal of a gas from the outer case 10 at the time of occurrence of an unusual state (in emergency) is performed through the second opening portion 82. The first opening portion 81 functions as not only an opening portion through which a gas is discharged to the outside from the inside of the outer case 10 but also an opening portion through which a gas is taken (sucked) into the inside of the outer case 10 from the outside. That is, the first opening portion 81 has a function of lowering a pressure difference between the inside and the outside of the outer case 10 during a normal operation (pressure equalizing function).

In the case where two members having different functions are disposed on one opening portion in a state where two members are arranged in parallel, for example, there is a possibility that the structure or the manufacturing steps become complicated so as to prevent the formation of a gap between two members. In this embodiment, however, a member which closes the first opening portion 81 is disposed on the first opening portion 81, and a member which closes the second opening portion 82 is disposed on the second opening portion 82. Accordingly, it is possible to allow the energy storage apparatus 1 to have the above-mentioned gas removing function during a normal operation, a pressure equalizing function, and a gas removing function (internal pressure control function) at the time of occurrence of an unusual state (in emergency) with a relatively easy structure or relatively easy manufacturing steps.

To be more specific, in this embodiment, the first member 91 is a sheet-like member. To be more specific, the first member 91 is formed of a film having a function of allowing a gas to pass through the film and a function of preventing a liquid from passing through the film (waterproof gas permeable film). The first member 91 is a film made of a waterproof moisture permeable material having waterproofness and gas permeability (moisture permeability) such as Gore-Tex (registered trademark) or TEMISH (registered trademark), for example.

In this embodiment, the second member 92 is a sheet-like member. To be more specific, the second member 92 is a film having a function of preventing a gas and a liquid from passing through the film. The second member 92 is a member which releases (reduces) pressure in the inside of the outer case 10 when the pressure in the inside of the outer case 10 exceeds a predetermined pressure. As a material for forming the second member 92, a resin-made film, a metal foil or the like is adopted, for example.

The sheet-like first member 91 is bonded to a periphery of the first opening portion 81, and the sheet-like second member 92 is bonded to a periphery of the second opening portion 82. Such bonding may be performed using an adhesive, a pressure-sensitive adhesive, a double-sided adhesive tape or the like, for example. Alternatively, such bonding may be performed by heat-sealing. With such bonding, the first member 91 and the second member 92 can be relatively easily disposed respectively.

As described above, in the energy storage apparatus 1 according to this embodiment, a pressure difference between the inside and the outside of the outer case 10 during a normal operation is reduced due to entering and exiting of a gas into and out of the outer case 10 through the first opening portion 81 and the through holes 70 (the plurality of through holes 70 in this embodiment). Further, for example, when an internal pressure of the outer case 10 is sharply elevated such as a case where a gas is discharged from the safety valve 105 of any one of energy storage devices 100, the second member 92 is peeled off from the second opening portion 82 so that the second opening portion 82 is opened whereby the elevated internal pressure in the outer case 10 is reduced. As a result, breaking or the like of the outer case 10 caused by the excessive elevation of the internal pressure of the outer case 10 can be prevented, for example.

In this embodiment, as shown in FIG. 6, the second member 92 includes: a relief valve portion 92a bonded to the periphery of the second opening portion 82; and a fixed portion 92b connected to the relief valve portion 92a and fixed to a portion outside the periphery of the second opening portion 82.

That is, the relief valve portion 92a is a portion which directly receives an internal pressure of the outer case 10. The relief valve portion 92a is peeled off from the periphery of the second opening portion 82 when the internal pressure of the outer case 10 exceeds a predetermined internal pressure and, as a result, the internal pressure of the outer case 10 is reduced. In this case, pressure which acts on the relief valve portion 92a in the direction in which the relief valve portion 92a is peeled off is almost eliminated and hence, a state where the fixed portion 92b is fixed to the portion outside the periphery of second opening portion 82 is maintained.

Accordingly, for example, even when the relief valve portion 92a is peeled off so as to open the second opening portion 82 due to the sharp elevation of an internal pressure in the outer case 10, the second member 92 can be retained at a predetermined position by the fixed portion 92b. With such a configuration, a possibility is reduced that the second member 92 obstructs the release of a gas to the outside from the inside of the outer case 10, for example.

Mounting strength of the second member 92 on the second opening portion 82 may be set smaller than mounting strength of the first member 91 on the first opening portion 81. In this case, since the second member 92 has low mounting strength, the second member 92 is easily removed from the second opening portion 82. Accordingly, when an internal pressure of the outer case 10 is sharply elevated, effectiveness of the second member 92 having a function of releasing the internal pressure is enhanced.

Mounting strength of the first member 91 and mounting strength of the second member 92 can be adjusted by changing an amount, a kind, a coating area or a coating position as viewed in a plan view (as viewed from the plus side in the Z axis direction, the same definition being applicable hereinafter) or the like of an adhesive by which the member is bonded to the outer case 10. For example, assume a case where an adhesive of the same kind is used for both bonding the first member 91 to the periphery of the first opening portion 81 (first bonding) and bonding the second member 92 to the periphery of the second opening portion 82 (second bonding). In this case, an amount of the adhesive used for the second bonding is set smaller than an amount of the adhesive used for the first bonding. With such setting of the amount of the adhesive, mounting strength of the second member 92 on the second opening portion 82 is set smaller than mounting strength of the first member 91 on the first opening portion 81.

In the case where the first member 91 and the second member 92 are respectively bonded to the outer case 10 by heat-sealing, for example, mounting strength of the first member 91 and mounting strength of the second member 92 can be respectively adjusted also by changing a heat-sealing area or a heat-sealing position as viewed in a plan view or the like.

As a method for comparing mounting strengths, a case is exemplified where a tensile test is applied to the first member 91 and the second member 92, for example. That is, a member which is connected to the first member 91 and the second member 92 respectively by adhesion, bonding or the like is pulled toward a direction where the first member 91 and the second member 92 are bonded to the outer case 10 (the plus side in the Z axis direction in this embodiment). As a result, it can be determined that one out of the first member 91 and the second member 92 which is removed from the outer case 10 first has lower mounting strength. Further, mounting strength of the first member 91 and mounting strength of the second member 92 can be compared with each other by measuring and comparing tensile forces necessary for removing the first member 91 and the second member 92 from the outer case 10.

When the energy storage apparatus 1 is mounted on a machine or an apparatus which is used outdoors such as an automobile, for example, there is a possibility that water such as rainwater reaches the through holes 70 disposed in the ventilation chamber 60. That is, there is a possibility that water such as rainwater flows into the ventilation chamber 60. Particularly, when a machine or an apparatus on which the energy storage apparatus 1 is mounted is exposed to heavy wind and rain, there may also be a case where water vigorously flows into the inside of the ventilation chamber 60.

However, in the ventilation chamber 60 according to this embodiment, the first wall 65 is disposed behind the through holes 70 (inside of the ventilation chamber 60) and hence, even when water flows into the ventilation chamber 60 through the through holes 70 at a high velocity, energy of water can be attenuated by the first wall 65. As a result, it is possible to suppress the inflow of water into the inside of the outer case 10 (a space where the energy storage devices 100 and the like are housed) through the ventilation chamber 60.

Even when water which flows into the ventilation chamber 60 reaches the positions of the first opening portion 81 and the second opening portion 82, both the first member 91 and the second member 92 have a function of preventing water from passing through the members and hence, it is possible to prevent water from flowing into the inside of the outer case 10 through the first opening portion 81 and the second opening portion 82.

When water which flows into the ventilation chamber 60 from the outside stays on the first member 91, for example, there is a concern that a function of the first member 91 as a waterproof gas permeable film is impaired. When the second member 92 is immersed in water, for example, there is also a concern that a defect occurs in the operation of the second member 92 (opening of the second member 92 when an internal pressure of the outer case 10 is elevated).

However, in this embodiment, the gap 67 exists between the first wall 65 and the first side wall 68$b$ over a distance from the front wall 63 to the back wall 64 so that the gap 67 forms a passage for a fluid along the first direction (X axis direction). With the formation of the gap 67, even when water flows into the ventilation chamber 60, drainage of water from the ventilation chamber 60 is promoted. As a result, it is possible to reduce a possibility of the occurrence of a defect caused by the stagnation of water in the ventilation chamber 60.

The ventilation chamber 60 has the simple structure which is basically formed of a plurality of walls and hence, the ventilation chamber 60 can enhance resistance against water which flows into the ventilation chamber 60 and also can promote drainage of water which flows into the ventilation chamber 60. That is, while the ventilation chamber 60 is configured to allow water to flow into the inside of the ventilation chamber 60 from the outside for enabling discharging of a gas to the outside from the inside of the outer case 10, the ventilation chamber 60 promotes discharging of water which flows into the ventilation chamber 60 to the outside from the ventilation chamber 60 with the relatively simple structure.

In this embodiment, to focus on an axis of the through holes 70 (an imaginary straight line which passes the center of holes or an opening and is parallel to the penetration direction, the same definition being applicable hereinafter) and axes of the first opening portion 81 and the second opening portion 82, it is safe to say the following.

The outer case 10 has the ventilation chamber 60 where the first opening portion 81, the second opening portion 82 and the through holes 70 communicating with the outside of the outer case 10 are disposed. The first opening portion 81 and the second opening portion 82 are disposed at positions where the first opening portion 81 and the second opening portion 82 communicate with the outside of the outer case 10 through the through holes 70. In such a structure, assume a direction of the axis of the first opening portion 81 as a first axial direction, a direction of the axis of the second opening portion 82 as a second axial direction, and a direction of the axes of the through holes 70 as a third axial direction. In this case, the first axial direction and the second axial direction intersect with the third axial direction.

To be more specific, in this embodiment, both the first axial direction and the second axial direction agree with the Z axis direction, and the third axial direction agrees with the X axis direction. That is, the first axial direction and the second axial direction intersect with the third axial direction.

Accordingly, even when water flows into the ventilation chamber 60 through the through holes 70 at a high velocity, since the direction of the axis of the through holes 70 and the direction of the axes of the opening portions (the first opening portion 81 and the second opening portion 82 in this embodiment) disposed in the ventilation chamber 60 intersect with each other, structurally, a possibility is reduced that water advances toward the opening portions (the first opening portion 81 and the second opening portion 82 in this embodiment) from the axial direction of the opening portions. That is, a possibility is reduced that water advances toward the opening portions from the direction in which water easily passes through the opening portions.

It is sufficient that at least one of the first axial direction and the second axial direction intersect with the third axial direction. With such a configuration, a possibility is reduced that water which flows into the ventilation chamber 60 advances toward at least one of the first opening portion 81 and the second opening portion 82 which corresponds to at least one of the first axial direction and the second axial direction from the axial direction of the opening portion.

It is not always necessary that both the first opening portion 81 and the second opening portion 82 are disposed in the ventilation chamber 60. One of the first opening portion 81 and the second opening portion 82 may be disposed at a portion of the outer case 10 which differs from the ventilation chamber 60. Also in such a case, by making the direction of an axis of the opening portion disposed in the ventilation chamber 60 (the first axial direction or the second axial direction) intersect with the direction of the axis of the through holes 70 (third axial direction), a possibility is reduced that water advances toward the opening portion from the axial direction of the opening portion. An example of the structure where one of the first opening portion 81 and the second opening portion 82 is disposed at a portion of the outer case 10 other than the ventilation chamber 60 is described later as a modification 4.

In this embodiment, the ventilation chamber 60 further includes second walls 66 which are disposed between the first wall 65 and the back wall 64 and form the gap 67 between the second walls 66 and the first side wall 68$b$.

By further forming the second walls 66 in the ventilation chamber 60, energy of water which flows into the ventilation chamber 60 through the through holes 70 can be further weakened. The gap 67 which forms a passage for a fluid also exists between the first side wall 68*b* and the second walls 66 and hence, favorable drainage is not impaired by the second walls 66.

To be more specific, in the ventilation chamber 60, the plurality of second walls 66 are arranged in a row in the first direction (X axis direction). In this embodiment, two second walls 66 are arranged in a row in the X axis direction between the first wall 65 and the back wall 64. Further, the first wall 65 and the plurality of second walls 66 are disposed such that the first wall 65 and the plurality of respective second walls 66 are shifted from each other in the direction which intersects with the first direction (X axis direction). To be more specific, three walls (the first wall 65 and two second walls 66) are disposed such that the first wall 65 and the second wall 66 are shifted alternately in the plus side and in the minus side in the Y axis direction. That is, as viewed in a plan view, the first wall 65 and two second walls 66 are disposed in a zigzag manner while ensuring a straight-line passage for a fluid (gap 67).

That is, in this embodiment, three walls which provide resistance against water which flows into the ventilation chamber 60 from the outside are disposed in the ventilation chamber 60. Three respective walls which are arranged in a row in the X axis direction are arranged such that distances between three walls and the first side wall 68*b* become different from each other alternately, for example. That is, when viewed in the direction toward the back wall 64 from a through hole 70, for example, a right end portion of one of two walls disposed adjacently to each other in the longitudinal direction (X axis direction) projects rightward more than a right end portion of the other of two walls. To describe a positional relationship between the second side wall and respective walls, for example, the plurality of walls disposed adjacently to each other in the X axis direction have a difference in distance in the Y axis direction from the wall to the second side wall. In this embodiment, the first wall 65 and two second walls 66 are disposed such that a distance between the first wall 65 and the second side wall 68*c* is large, a distance between one of the second walls 66 and the second side wall 68*c* is small, and a distance between the other of the second walls 66 and the second side wall 68*c* is large.

Accordingly, the behavior of water which flows into the ventilation chamber 60 through the through holes 70 can be described as follows, for example. Most of water which flows into the ventilation chamber 60 through the through holes 70 and impinges on the first wall 65 flows into a gap having a larger width out of gaps formed on left and right sides of the first wall 65 (in this embodiment, the gap formed on the left side of the first wall 65 as viewed from the through holes 70). In this case, at a point of time that water impinges on the first wall 65, energy of water becomes considerably small. Energy of water which flows into the gap having a smaller width (in this embodiment, the gap formed on the right side of the first wall 65 as viewed from the through holes 70) becomes further small.

Since the second wall 66 exists on an advancing path of water which flows into the gap formed on the left side of the first wall 65, the water impinges on the second wall 66 so that energy of water is further weakened. Then, most of water which impinges on the second wall 66 is guided to the gap having a larger width than other gaps formed on left and right sides of the second wall 66 (in this embodiment, the gap formed on a right side as viewed from the through holes 70). In this manner, roughly speaking, water which flows into the ventilation chamber 60 through the through holes 70 meanders toward a left side and a right side with behaviors consisting of impingement on the wall, advancing to the gap having a larger width than other gaps formed on left and right sides of the wall, and impingement on the wall positioned on an advancing path that the water advances.

That is, the ventilation chamber 60 has a labyrinth structure where a zig-zag shaped water flow passage is formed. As a result, it is possible to acquire an effect of efficiently lowering energy of water which flows into the ventilation chamber 60 (labyrinth effect).

It is not indispensable that the plurality of walls in the ventilation chamber 60 be disposed in a shifted manner from each other in the direction which intersects with the first direction (X axis direction). That is, for example, center axes of the plurality of walls in the Y axis direction may agree with each other. In this case, for example, the second walls 66 positioned behind the first wall 65 may be disposed at positions and with sizes so that the second walls 66 are concealed entirely by the first wall 65 as viewed from the through hole 70. Also in such a case, water impinges on the first wall 65 and, thereafter, water is routed around to a back side (second wall 66 side) of the first wall 65 from a left or a right side of the first wall 65. In this case, at least a portion of the water routed around to the back side of the first wall 65 is prevented from moving in the direction toward the back wall 64 by the second wall 66. With such a configuration, compared to a case where the second walls 66 are not disposed in the ventilation chamber 60, energy of water which flows into the ventilation chamber 60 can be further lowered.

From a viewpoint of suppressing intrusion of water into the inside of the outer case 10 through the ventilation chamber 60, it is preferable that the second walls 66 positioned behind the first wall 65 be formed at positions and with sizes so that the second walls 66 project from both left and right sides of the first wall 65 as viewed from the through hole 70. In this case, water impinges on the first wall 65 and, thereafter, is guided to gaps formed on left and right side of the first wall 65 respectively. Since the second walls 66 exist on an advancing path of water, water which is guided to the gaps is prevented from moving in the direction toward the back walls 64. With such a configuration, energy of water which advances after passing through both left and right sides of the first wall 65 can be efficiently lowered.

In the ventilation chamber 60 according to this embodiment, for example, as shown in FIG. 6, the gaps are formed between three walls and both left and right side walls (the first side wall 68*b* and the second side wall 68*c*) and hence, drainage of water which flows into the ventilation chamber 60 can be enhanced.

In this embodiment, as shown in FIG. 5 and FIG. 6, the ventilation chamber 60 includes: a first ventilation chamber 61 where the first opening portion 81 and the second opening portion 82 are disposed; and a second ventilation chamber 62 where the through holes 70 are disposed. To be more specific, the ventilation chamber 60 is partitioned into the first ventilation chamber 61 and the second ventilation chamber 62 by the first side wall 68*b*, and the first side wall 68*b* functions as a member which obstructs the flow of water advancing toward the first ventilation chamber 61 from the second ventilation chamber 62. Accordingly, a possibility is reduced that water which flows into the ventilation chamber 60 through the through holes 70 reaches the first opening portion 81 and the second opening portion 82. That is, a possibility that water intrudes into the inside of the outer case 10 through the first opening portion 81 or the second opening portion 82 is reduced.

As shown in FIG. 5 and FIG. 6, a gap exists between the first side wall 68b and the front wall 63. Accordingly, for example, even when water which flows into the ventilation chamber 60 through the through holes 70 at a high velocity reaches the first ventilation chamber 61 through the gap 67 formed between the first side wall 68b and the first wall 65, the gap formed between the first side wall 68b and the front wall 63 functions as a short-circuit path for draining water. That is, drainage of water from the first ventilation chamber 61 can be efficiently performed.

It is not always necessary that both the first opening portion 81 and the second opening portion 82 be disposed in the first ventilation chamber 61. For example, either one of the first opening portion 81 or the second opening portion 82 may be disposed in the second ventilation chamber 62 or at a position located in the outer case 10 outside the ventilation chamber 60. In either case, a possibility is reduced that water which flows into the ventilation chamber 60 through the through holes 70 reaches at least one of the first opening portion 81 and the second opening portion 82 disposed in the first ventilation chamber 61.

In this embodiment, for example, as shown in FIG. 5 and FIG. 6, the outer case 10 further includes a ventilation pipe 15 which is disposed outside the front wall 63 and communicates with the through holes 70.

With such a configuration, the direction in which a gas is discharged from the outer case 10 is restricted to the axial direction of the ventilation pipe 15 and hence, for example, it is possible to easily design a machine, an apparatus or the like on which the energy storage apparatus 1 is mounted while taking into account the treatment of a discharged gas.

Further, the flow of water which advances to the through holes 70 from the outside of the outer case 10 is restricted to the axial direction of the ventilation pipe 15 and hence, a possibility is reduced that water which flows into the ventilation chamber 60 though the through holes 70 advances toward the gap 67 formed between the first wall 65 and the first side wall 68b. That is, it is possible to enhance the effectiveness of the first wall 65 as a member which obstructs the flow of water flowing into the ventilation chamber 60 from the outside.

For example, as shown in FIG. 5, a mesh portion 75 where the plurality of through holes 70 are formed is formed on the front wall 63 which the ventilation chamber 60 includes. That is, each of a plurality of holes having a relatively small opening area which the mesh portion 75 has functions as the through hole 70 for ventilation. Accordingly, it is possible to suppress the entrance of a relatively large foreign substance into the ventilation chamber 60 through the through hole 70.

The mesh portion 75 may be integrally formed with the front wall 63 in a step of forming the front wall 63 by molding, for example. Alternatively, a plurality of through holes may be formed in the front wall 63 in such a manner that one relatively large through hole is formed in the front wall 63 and the mesh portion 75 which is formed as a separate body is disposed in the through hole.

In this embodiment, while the ventilation chamber 60 has two opening portions (the first opening portion 81 and the second opening portion 82) communicating with the inside of the outer case 10, both opening portions are disposed at positions where the opening portions do not overlap with the gap 67 as viewed in a plan view.

Accordingly, a possibility is reduced that water which flows into the ventilation chamber 60 flows into the inside of the outer case 10 where the energy storage devices 100 and the like are disposed through the first opening portion 81 and the second opening portion 82.

In this embodiment, the ventilation chamber 60 has both the first opening portion 81 and the second opening portion 82 and, in the ventilation chamber 60, the first member 91 is disposed at a position remoter from the through holes 70 than the second member 92. To be more specific, with respect to a length of a path for a fluid, a distance from one through hole 70 out of the plurality of through holes 70 which is positioned closest to either one of the first member 91 or the second member 92 to the first member 91 is larger than a distance from the through hole 70 to the second member 92.

Accordingly, for example, water which flows into the ventilation chamber 60 from the outside through the through holes 70 minimally reaches the first member 91. As a result, a possibility is reduced that water flows into the inside of the outer case 10 through the first opening portion 81. To be more specific, for example, a possibility is reduced that intrusion of water or the like through the first member 91 occurs due to soaking of the first member 91 in water.

At least at a portion of the bottom surface 69 of the ventilation chamber 60 according to this embodiment has a difference in height. With such a configuration, water which flows into the ventilation chamber 60 can be efficiently discharged. Such a configuration is described with reference to FIG. 7 and FIG. 8.

Figure 7:
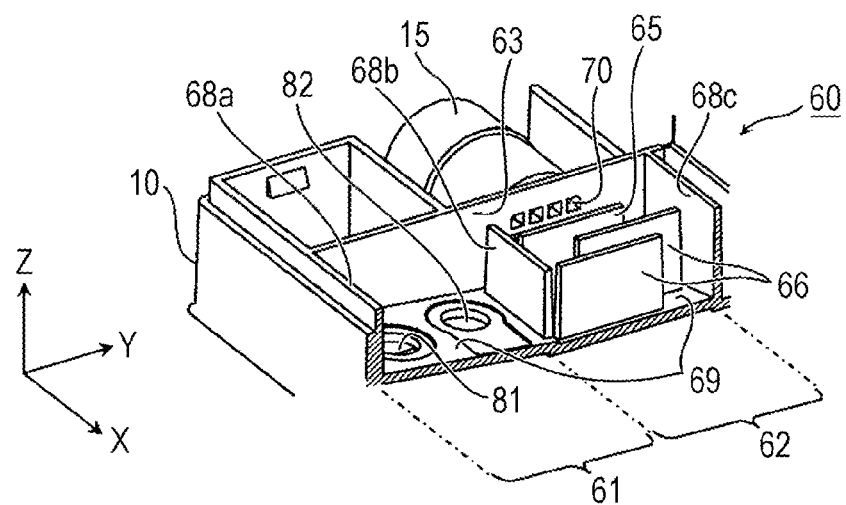
FIG. 7 is a first cross-sectional perspective view showing an internal structure of the ventilation chamber according to the embodiment.
Figure 8:
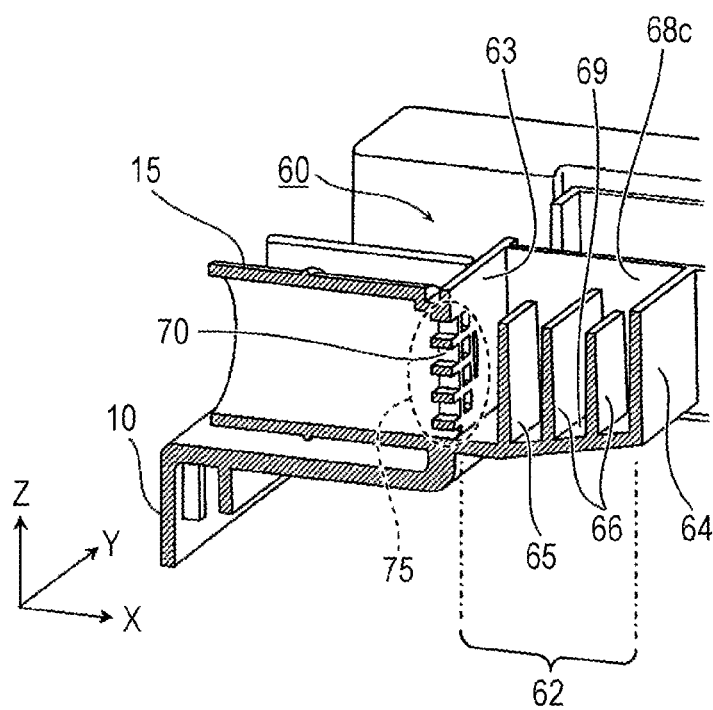
FIG. 8 is a second cross-sectional perspective view showing the internal structure of the ventilation chamber according to the embodiment.

FIG. 7 is a first cross-sectional perspective view showing an internal structure of the ventilation chamber 60 according to the embodiment. FIG. 8 is a second cross-sectional perspective view showing the internal structure of the ventilation chamber 60 according to the embodiment. To be more specific, FIG. 7 is a cross-sectional perspective view of the ventilation chamber 60 taken along a plane parallel to a YZ plane, and FIG. 8 is a cross-sectional perspective view of the ventilation chamber 60 taken along a plane parallel to an XZ plane. In both FIG. 7 and FIG. 8, the illustration of the outer case 10 of the container 12 is omitted.

In this embodiment, as shown in FIG. 7 and FIG. 8, at least a portion of the bottom surface 69 of the ventilation chamber 60 has a difference in height such that the bottom surface 69 in a vicinity of the through holes 70 is low. That is, at least a portion of the bottom surface 69 of the ventilation chamber 60 has a difference in height such that the height difference increases as the bottom surface 69 extends toward the through holes 70. With such a configuration, for example, when water flows into the ventilation chamber 60, drainage of water through the through holes 70 (drainage of water from ventilation chamber 60) can be performed more efficiently.

To be more specific, as shown in FIG. 7, the bottom surface 69 of the first ventilation chamber 61 where the first opening portion 81 and the second opening portion 82 are formed is inclined downward toward the second ventilation chamber 62 where the through holes 70 are formed. Accordingly, water which flows into the first ventilation chamber 61 is easily returned to the second ventilation chamber 62. As a result, drainage of water through the through holes 70 formed in the second ventilation chamber 62 is promoted.

As shown in FIG. 8, the bottom surface of the second ventilation chamber 62 where the through holes 70 are formed is inclined downward toward the front wall 63 in which the through holes 70 are formed. Accordingly, water which flows into the second ventilation chamber 62 through the through holes 70 and water which is returned from the first ventilation chamber 61 can easily reach the front wall 63. As a result, drainage of water through the through holes 70 formed in the front wall 63 is promoted.

In this embodiment, as shown in FIG. 8, the mesh portion 75 which forms the plurality of through holes 70 has the through holes 70 also at a height equal to the position of the bottom surface 69. With such a configuration, for example, almost all water which flows into the ventilation chamber 60 can be discharged.

When focusing on the height positions of the first member 91 and the second member 92, the ventilation chamber 60 has the following technical features. That is, the ventilation chamber 60 has both the first opening portion 81 and the second opening portion 82, and is disposed above the bottom surface of the outer case 10. In the ventilation chamber 60, the first member 91 is disposed at a position higher than a position of the second member 92. To be more specific, as shown in FIG. 7, the first opening portion 81 is disposed at a position higher than a position of the second opening portion 82 (on the plus side in the Z axis direction) and hence, the first member 91 which closes the first opening portion 81 is disposed at the position higher than the position of the second member 92 which closes the second opening portion 82.

Accordingly, in a posture which the energy storage apparatus 1 assumes when the energy storage apparatus 1 is used in a normal mode, the first member 91 which has higher gas permeability than the second member 92 is disposed at the relatively high position. Accordingly, for example, even when water flows into the ventilation chamber 60 from the outside, a possibility is reduced that ingress of water or the like through the first member 91 occurs due to soaking of the first member 91 in water.

As a structure (ventilation structure) for ventilation from either one of the inside or the outside of the outer case 10 to the other of the inside or the outside of the outer case 10, the energy storage apparatus 1 may have a ventilation structure which differs from the ventilation chamber 60 shown in FIG. 4 to FIG. 8. The ventilation structures of the outer cases 10 according to several modifications of the embodiment are described hereinafter mainly with respect to points which make the modifications differ from the above-mentioned embodiment.

Modification 1

Figure 9:
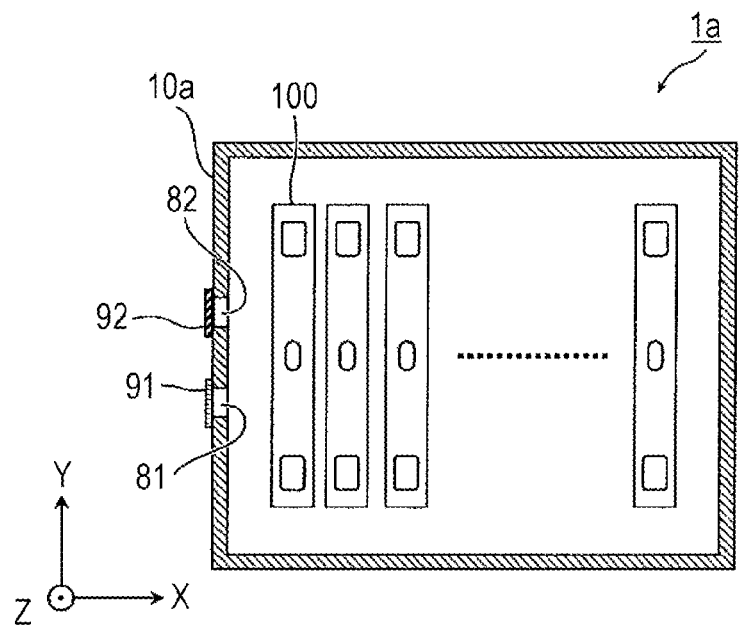
FIG. 9 is a cross-sectional view schematically showing a ventilation structure of an energy storage apparatus according to a modification 1 of the embodiment.

FIG. 9 is a cross-sectional view schematically showing a ventilation structure of an energy storage apparatus 1a according to a modification 1 of the embodiment. FIG. 9 shows an outer case 10a which the energy storage apparatus 1a includes in cross section taken along a plane parallel to an XY plane at a position of the ventilation structure which includes a first opening portion 81, a second opening portion 82 and the like. A shape of the outer case 10a is illustrated in a simplified manner such that the technical features of the outer case 10a appear most and hence, the illustration of a holder 30, a bus bar 41 and the like is omitted. These supplementary descriptions in FIG. 9 are also applied to modifications shown in FIG. 10 to FIG. 13 which are described later.

The energy storage apparatus 1a shown in FIG. 9 includes the outer case 10a having the first opening portion 81 and the second opening portion 82 both of which respectively communicate with the outside of the outer case 10a. The energy storage apparatus 1a further includes: a first member 91 which covers the first opening portion 81 and has waterproofness and gas permeability; and a second member 92 which covers the second opening portion 82 and releases pressure in the outer case 10a when the pressure exceeds a predetermined pressure. That is, with respect to the above-mentioned structure, the energy storage apparatus 1a according to this modification has the similar structure as the energy storage apparatus 1 according to the embodiment.

However, the energy storage apparatus 1a according to this modification does not include a constitutional element which can be referred to as a ventilation chamber (ventilation space) in a clearly distinguished manner from other constitutional element.

Also in this case, by disposing the first member 91 formed of a waterproof gas permeable film on the first opening portion 81 which the outer case 10a includes, and by disposing the second member 92 which prevents a gas and a liquid from passing therethrough on the second opening portion 82 which the outer case 10a includes, it is possible to provide the opening portions having different functions respectively. To be more specific, the first opening portion 81 performs the removal of a gas from the outer case 10a and equalizes a pressure between the inside and the outside of the outer case 10a during a normal operation. The second opening portion 82 performs the removal of a gas from the outer case 10a at the time of occurrence of an unusual state (in emergency).

Further, compared to a case where two members having different functions are disposed on one opening portion in a state where two members are arranged parallel to each other, it is possible to provide the energy storage apparatus 1a with an internal pressure control function during a normal operation and at the time of occurrence of an unusual state (in emergency) with a relatively easy structure or in relatively easy manufacturing steps.

Modification 2

Figure 10:
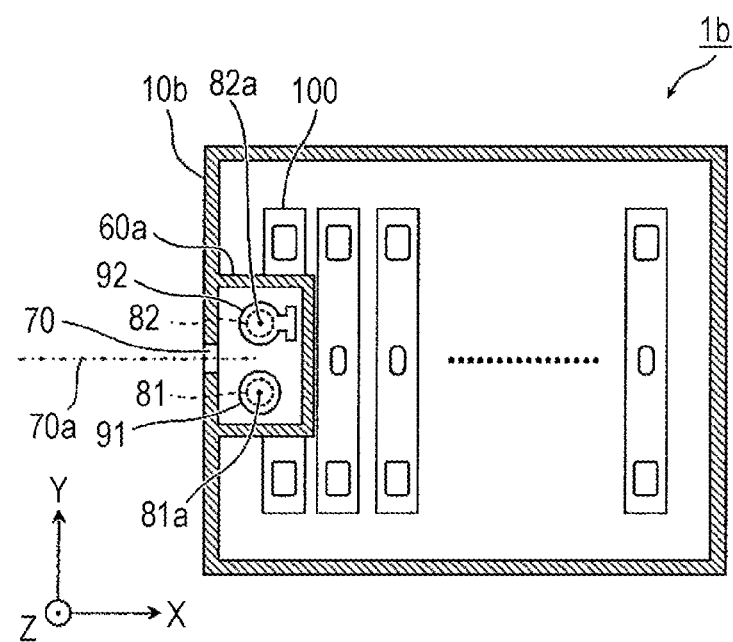
FIG. 10 is a cross-sectional view schematically showing a ventilation structure of an energy storage apparatus according to a modification 2 of the embodiment.

FIG. 10 is a cross-sectional view schematically showing a ventilation structure of an energy storage apparatus 1b according to a modification 2 of the embodiment. In the energy storage apparatus 1b shown in FIG. 10, an outer case 10b includes a ventilation chamber 60a where a first opening portion 81, a second opening portion 82, and a through hole 70 communicating with the outside of the outer case 10b are disposed. The first opening portion 81 and the second opening portion 82 are disposed at positions where the first opening portion 81 and the second opening portion 82 communicate with the outside of the outer case 10b through the through hole 70. In such a structure, assume a direction of an axis of the first opening portion 81 (first axis 81a) as a first axial direction, a direction of an axis of the second opening portion 82 (second axis 82a) as a second axial direction, and a direction of an axis of the through hole 70 (third axis 70a) as a third axial direction. In this modification, both the first axial direction and the second axial direction agree with the Z axis direction, and the third axial direction agrees with the X axis direction. In this case, the first axial direction and the second axial direction intersect with the third axial direction. That is, with respect to the above-mentioned structure, the energy storage apparatus 1b according to this modification has the similar structure as the energy storage apparatus 1 according to the embodiment.

However, in the energy storage apparatus 1b according to this modification, walls such as the first wall 65 and the second wall 66 are not disposed in the ventilation chamber 60a. Also in this case, the direction of the axis of the through hole 70 and the direction of the axes of the opening portions (the first opening portion 81 and the second opening portion 82 in this modification) disposed in the ventilation chamber 60a intersect with each other. Accordingly, even when water flows into the ventilation chamber 60a through the through hole 70 at a high velocity, structurally, a possibility is reduced that water advances toward the opening portion from the axial direction of the opening portion.

In this modification, the first axial direction and the second axial direction respectively make an angle of 90° with respect to the third axial direction. However, it is not indispensable that the angle is set to 90°. For example, assume a case where the first axial direction and the third axial direction are not parallel to each other, and an angle made by the first axial direction and the third axial direction is not set to 90°. Also in this case, the first axial direction and the third axial direction intersect with each other. Accordingly, even when water flows into the ventilation chamber 60a through the through hole 70 at a high velocity, a possibility is reduced that water advances toward the first opening portion 81 from the first axial direction.

Modification 3

Figure 11:
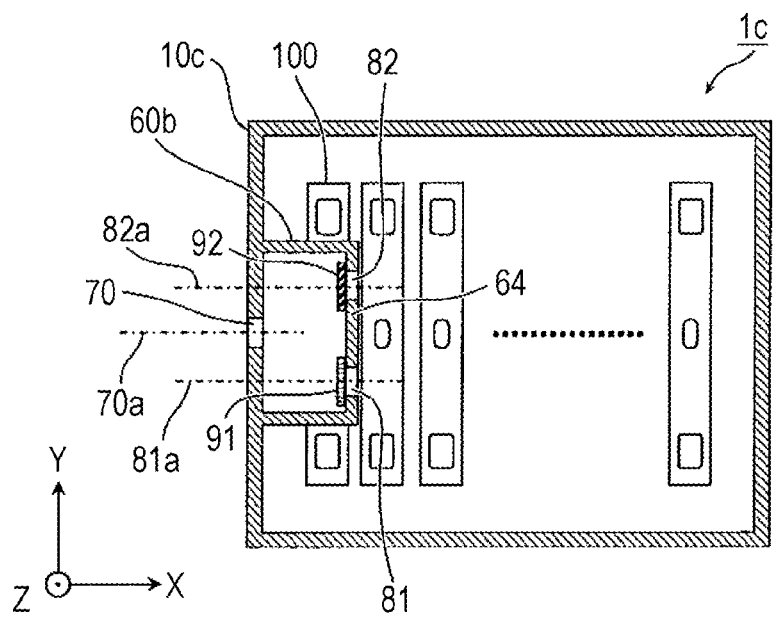
FIG. 11 is a cross-sectional view schematically showing a ventilation structure of an energy storage apparatus according to a modification 3 of the embodiment.

FIG. 11 is a cross-sectional view schematically showing a ventilation structure of an energy storage apparatus 1c according to a modification 3 of the embodiment. In the energy storage apparatus 1c shown in FIG. 11, an outer case 10c includes a ventilation chamber 60b where a first opening portion 81, a second opening portion 82 and a through hole 70 communicating with the outside of the outer case 10c are disposed. The first opening portion 81 and the second opening portion 82 are disposed at positions where the first opening portion 81 and the second opening portion 82 communicate with the outside of the outer case 10c by way of the through hole 70. That is, with respect to the above-mentioned structure, the energy storage apparatus 1c according to this modification has the similar structure as the energy storage apparatus 1 according to the embodiment.

However, in the energy storage apparatus 1c according to this modification, a first axis 81a and a second axis 82a which are axes of the first opening portion 81 and the second opening portion 82 are parallel to a third axis 70a which is an axis of the through hole 70. That is, as shown in FIG. 11, the first axis 81a and the second axis 82a are respectively parallel to the X axis direction in the same manner as the third axis 70a. Further, neither the first axis 81a nor the second axis 82a overlaps with the third axis 70a in a three dimensional space. The energy storage apparatus 1c according to this modification differs from the energy storage apparatus 1 according to the embodiment with respect to the above-mentioned point.

With such a configuration, even when water flows into the ventilation chamber 60b through the through hole 70 at a high velocity, since the third axis 70a overlaps with neither the first axis 81a nor the second axis 82a, structurally, a possibility is reduced that water advances toward the first opening portion 81 and the second opening portion 82 from the axial directions of the opening portions.

It is sufficient that at least one of the first axis 81a and the second axis 82a be parallel to the third axis 70a. With such a configuration, a possibility is reduced that water which flows into the ventilation chamber 60b through the through hole 70 advances from the axial direction of the opening portion with respect to at least one of the first opening portion 81 and the second opening portion 82 which corresponds to at least one of the first axis 81a and the second axis 82a.

One of the first opening portion 81 and the second opening portion 82 may be disposed at a position outside the ventilation chamber 60b of the outer case 10c. Also in this case, by setting the axis (the first axis 81a or the second axis 82a) of the opening portion disposed in the ventilation chamber 60b parallel to the third axis 70a of the through hole 70, a possibility is reduced that water advances toward the opening portion from the axial direction.

In FIG. 11, a back wall 64 in which the first opening portion 81 and the second opening portion 82 are formed may have a shape projecting toward the plus side or the minus side in the X axis direction. In this case, the first axis 81a and the second axis 82a are inclined in an XY plane, for example, and hence, the direction of the first axis 81a (first axial direction) and the direction of the second axis 82a (second axial direction) intersect with the direction of the third axis 70a (third axial direction). Accordingly, as described in the above-mentioned modification 2, even when water flows into the ventilation chamber 60b through the through hole 70 at a high velocity, structurally, a possibility is reduced that water advances toward the first opening portion 81 and the second opening portion 82 from the axial directions of the opening portions respectively.

Modification 4

Figure 12:
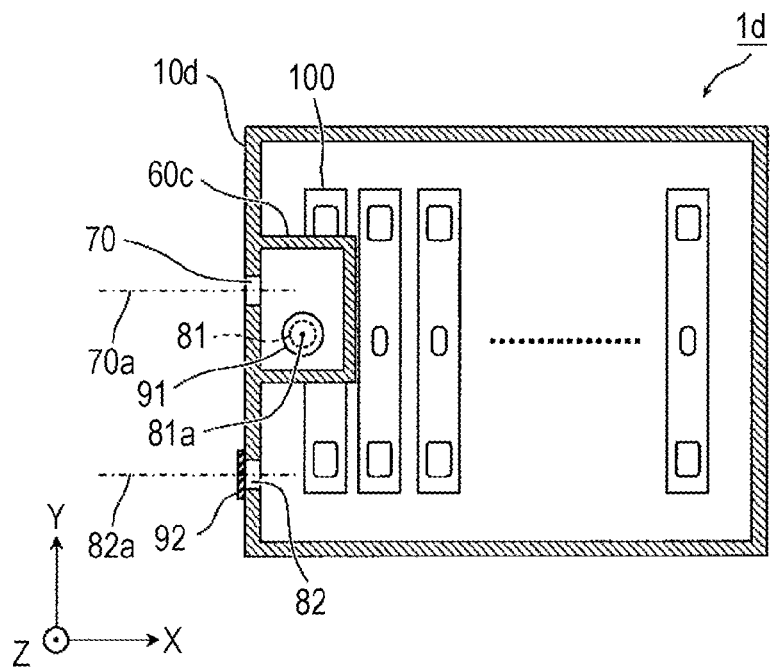
FIG. 12 is a cross-sectional view schematically showing a ventilation structure of an energy storage apparatus according to a modification 4 of the embodiment.

FIG. 12 is a cross-sectional view schematically showing a ventilation structure of an energy storage apparatus 1d according to a modification 4 of the embodiment. In the energy storage apparatus 1d shown in FIG. 12, an outer case 10d has a first opening portion 81, a second opening portion 82 and a through hole 70 communicating with the outside of the outer case 10d. The first opening portion 81 and the through hole 70 are disposed in a ventilation chamber 60c which the outer case 10d includes. That is, with respect to the above-mentioned structure, the energy storage apparatus 1d according to this modification and the energy storage apparatus 1 according to the embodiment have the similar structure.

However, in the energy storage apparatus 1d according to this modification, the second opening portion 82 is not disposed in the ventilation chamber 60c, but is disposed on one side wall portion (second side wall) of the outer case 10d. Also in this case, the direction of a third axis 70a of the through hole 70 (third axial direction) and the direction of a first axis 81a of the first opening portion 81 disposed in the ventilation chamber 60c (first axial direction) intersect with each other. Accordingly, even when water flows into the ventilation chamber 60c through the through hole 70 at a high velocity, structurally, a possibility is reduced that water advances toward the first opening portion 81 from the first axial direction.

As in the case of the modification 3 described previously, the first opening portion 81 may be disposed in the ventilation chamber 60c such that the first axis 81a is parallel to the third axis 70a. Also in this case, a possibility is reduced that water advances toward the first opening portion 81 from the first axial direction.

The second opening portion 82 may be disposed in the ventilation chamber 60c, and the first opening portion 81 may be disposed in a portion of the outer case 10d other than the ventilation chamber 60c. In this case, by disposing the second opening portion 82 such that the direction of the second axis 82a (second axial direction) and the third axial direction intersect with each other, a possibility is reduced that water which flows into the ventilation chamber 60c through the through hole 70 advances toward the second opening portion 82 from the second axial direction. Further, as in the case of the modification 3, by disposing the second opening portion 82 in the ventilation chamber 60c such that the second axis 82a is parallel to the third axis 70a, a possibility is reduced that water advances toward the second opening portion 82 from the second axial direction.

In this modification, for example, by taking into account that the first member 91 is formed of a waterproof gas permeable film having gas permeability and the second member 92 is formed of a member having no gas permeability (or having lower gas permeability than the first member 91), it is safe to say that the configuration where the first opening portion 81 (and the first member 91) is disposed in the ventilation chamber 60c is advantageous from a viewpoint of reducing a possibility that water outside the outer case 10d intrudes into the outer case 10d.

Meanwhile, for example, by taking into account that a gas of high temperature is discharged through the second opening portion 82, it is safe to say that the configuration where the second opening portion 82 (and the second member 92) is disposed in the ventilation chamber 60c is advantageous from a viewpoint of lowering energy of a gas of a high temperature and heat of the gas.

In this modification, the through hole 70 and the second opening portion 82 are formed in the same side wall portion of the outer case 10d. However, the through hole 70 and the second opening portion 82 may be formed in different side wall portions respectively. For example, a position on the outer case 10d where the second opening portion 82 is disposed may be determined corresponding to a position where a member or a structure which treats a gas of high temperature discharged from the second opening portion 82 is disposed.

Modification 5

Figure 13:
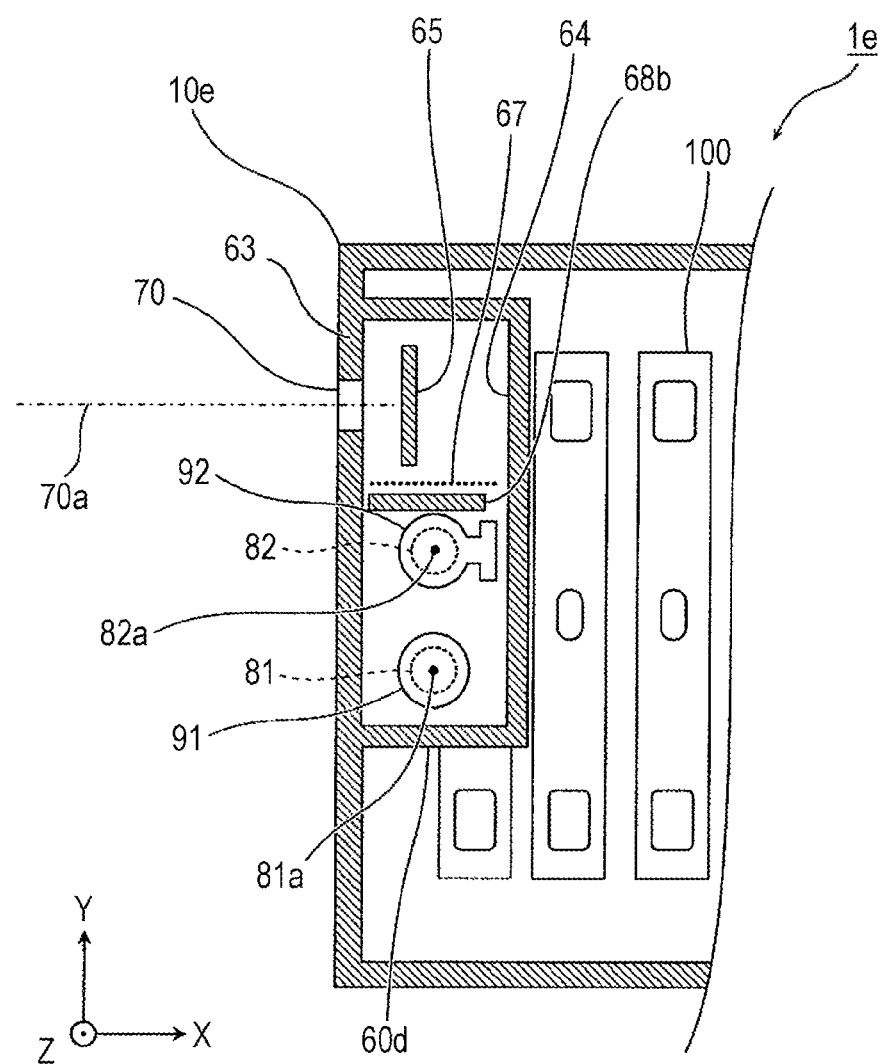
FIG. 13 is a cross-sectional view schematically showing a ventilation structure of an energy storage apparatus according to a modification 5 of the embodiment.

FIG. 13 is a cross-sectional view schematically showing a ventilation structure of an energy storage apparatus 1e according to a modification 5 of the embodiment.

In the energy storage apparatus 1e shown in FIG. 13, an outer case 10e has a ventilation chamber 60d where a first opening portion 81, a second opening portion 82 and a through hole 70 communicating with the outside of the outer case 10e are disposed. The first opening portion 81 and the second opening portion 82 are disposed at positions where the first opening portion 81 and the second opening portion 82 communicate with the outside of the outer case 10e through the through hole 70. That is, with respect to the above-mentioned structure, the energy storage apparatus 1e according to this modification has the similar structure as the energy storage apparatus 1 according to the embodiment.

However, in the energy storage apparatus 1e according to this modification, only a first wall 65 is disposed between the through hole 70 and a back wall 64. That is, walls like the second walls 66 are not disposed between the first wall 65 and the back wall 64. Further, in this modification, the outer case 10e does not include a member corresponding to the mesh portion 75 which is formed of the plurality of through holes 70 in the energy storage apparatus 1 according to the embodiment, and only one through hole 70 is formed in the outer case 10e. Also in this case, the first wall 65 is disposed behind the through hole 70 (the inner side in the outer case 10e) and hence, water which flows into a ventilation chamber 60d through the through hole 70 impinges on the first wall 65 so that energy of the water is weakened. As a result, a possibility is reduced that water which flows into the ventilation chamber 60d through the through hole 70 reaches the opening portions (the first opening portion 81 and the second opening portion 82 in this modification) disposed in the ventilation chamber 60d.

In this modification, the outer case 10e includes a first side wall 68b disposed in an extending manner along a first direction (X axis direction) which intersects with the front wall 68. A gap 67 (indicated by a bold dotted line in FIG. 13) is formed between the first side wall 68b and the first wall 65 along the first direction (X axis direction) over a distance from the front wall 63 to the back wall 64, and a passage for a fluid is formed of the gap 67 along the first direction (X axis direction). With such a configuration, even when water flows into the ventilation chamber 60d, drainage of water from the ventilation chamber 60d is promoted. As a result, it is possible to reduce a possibility of the occurrence of a defect caused by the stagnation of water in the ventilation chamber 60d.

Other Embodiments

Although the energy storage apparatuses according to the embodiment of the present invention and the modifications of the embodiment have been described heretofore, the present invention is not limited to the embodiment and the modifications of the embodiment. That is, it should be construed that the embodiment and the modifications of the embodiment disclosed in this specification are described only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention. Further, modes obtained by arbitrarily combining respective constitutional elements which the above-mentioned embodiment and the modifications of the embodiment include are also included in the scope of the present invention.

For example, in the ventilation chamber 60 according to the above-mentioned embodiment, the gap 67 formed over a distance from the front wall 63 to the back wall 64 along the first direction (X axis direction) is formed between the first wall 65 and the first side wall 68b which is mounted on the bottom surface 69 in an erected manner in a posture parallel to the XZ plane. However, the gap 67 which forms a passage for a fluid may be formed between the first wall 65 and another first side wall.

For example, it is safe to say that a portion of the lower lid 11a which forms the bottom surface 69 of the ventilation chamber 60 is a wall (first side wall) which is positioned on the minus side of the first wall 65 in the Z axis direction. That is, a gap 67 formed over a distance from the front wall 63 to the back wall 64 along the first direction may exist between the first wall 65 and the first side wall which forms the bottom surface 69 of the ventilation chamber 60. That is, the gap 67 may be formed below the first wall 65 (on the minus side in the Z axis direction). In this case, for example, by connecting a portion of the first wall 65 to the bottom surface 69, or by connecting the first wall 65 to the first side wall 68b or to the upper lid 11b, the first wall 65 can be fixed at a predetermined position in the ventilation chamber 60.

In this embodiment, for example, as shown in FIG. 6, a gap formed over a distance from the front wall 63 to the back wall 64 along the first direction exists also between the plurality of walls (one first wall 65 and two second walls 66) and the second side wall 68c disposed on a side opposite to the first ventilation chamber 61. However, it is not indispensable to form such a gap. For example, at least one out of one first wall 65 and two second walls 66 may be connected to the second side wall 68c. That is, provided that a gap is formed over a distance from the front wall 63 to the back wall 64 along the first direction between the first wall 65 and at least one of a lower first side wall, a left first side wall and a right first side wall of the first wall 65, it is possible to acquire an advantageous effect that drainage of water from the ventilation chamber 60 is promoted due to the formation of such a gap.

The first side wall of the first wall 65 may have a curved surface in place of a flat planar surface. For example, an inner shape of the ventilation chamber 60 may be a tubular shape having a tube axis parallel to the first direction, for example. In this case, a gap is formed over a distance from the front wall 63 to the back wall 64 along the first direction between the first wall 65 and the first side wall having a curved surface and hence, it is possible to acquire an advantageous effect that drainage of water from the ventilation chamber 60 is promoted.

Provided that the gap 67 forms a straight-line passage along the first direction as a whole, a fluid which passes through the gap 67 can be efficiently discharged. Accordingly, for example, even when a projecting portion which obstructs the movement of a fluid is formed on the first side wall 68b, provided that a portion exists where the projecting portion and the first wall 65 do not overlap with each other as viewed in the first direction, a straight-line passage for a fluid formed over a distance from the front wall 63 to the back wall 64 exists in at least a portion between the first wall 65 and the first side wall 68b.

For example, assume a case where the first wall 65 is disposed such that the first wall 65 opposedly faces one through hole 70. In such a case, when the first wall 65 is disposed at a position where the first wall 65 blocks the center of the through hole 70, energy of a foreign substance such as water which flows into the ventilation chamber 60 through the through hole 70 can be efficiently lowered. Further, as in the case of the above-mentioned embodiment, when the first wall 65 is disposed in the ventilation chamber 60 where the plurality of through holes 70 are formed, it is sufficient that the first wall 65 is disposed at a position where the first wall 65 blocks the center of a region where the plurality of through holes 70 are distributed. With such a configuration, energy of a foreign substance such as water which flows into the ventilation chamber 60 through the plurality of through holes 70 can be efficiently lowered.

By disposing the first wall 65 such that the first wall 65 exists within a range where the first wall 65 covers all of one or more through holes 70 which the ventilation chamber 60 has as viewed in the first direction, it is possible to further enhance an effect of lowering energy of a foreign substance such as water which flows into the ventilation chamber 60 through one or more through holes 70.

The second member 92 releases the second opening portion 82 by being peeled off from the periphery of the second opening portion 82 thus suppressing the elevation of an internal pressure of the outer case 10. However, the second member 92 may suppress the elevation of internal pressure of the outer case 10 such that when internal pressure of the outer case 10 is sharply elevated, the second member 92 opens the second opening portion 82 by being ruptured or broken, for example.

In the above-mentioned embodiment, the first member 91 is disposed in a state where the first member 91 covers the first opening portion 81 from a side opposite to the energy storage device 100. The second member 92 is disposed in a state where the second member 92 covers the second opening portion 82 from a side opposite to the energy storage device 100. With such a configuration, in a state where an external pressure of the outer case 10 is higher than an internal pressure of the outer case 10, a differential pressure between the external pressure and the internal pressure of the outer case 10 acts in the direction in which the first member 91 is pushed to the periphery of the first opening portion 81 and the second member 92 is pushed to the periphery of the second opening portion 82. Accordingly, for example, when an external pressure of the outer case 10 is higher than an internal pressure of the outer case 10, it is possible to acquire an advantageous effect that a case minimally occurs where the first member 91 and the second member 92 are removed due to the differential pressure.

However, the positions where the first member 91 and the second member 92 are disposed are not limited to the above-mentioned positions. For example, as described above, when the second member 92 is designed such that the second member 92 is ruptured or is broken when an internal pressure of the outer case 10 is sharply elevated, the second member 92 may be disposed in a state where the second member 92 covers the second opening portion 82 from a side where the energy storage device 100 is disposed.

The present invention can be realized not only in the form of an energy storage apparatus having such a configuration but also in the form of an outer case which the energy storage apparatus includes.

The present invention is applicable to an energy storage apparatus or the like which includes energy storage devices and an outer case which houses the energy storage devices therein.

What is claimed is:

1. An energy storage apparatus, comprising:
   an outer case; and
   an energy storage device housed in an inside of the outer case,
   wherein the outer case includes a ventilation chamber which makes the inside and an outside of the outer case communicate with each other,
   wherein the ventilation chamber comprises:
      a front wall in which a through hole communicating with the outside is formed;
      a back wall disposed at a position where the back wall opposedly faces the front wall;
      a first wall disposed between the through hole and the back wall;
      a first side wall disposed in an extending manner along a first direction which intersects with the front wall with a gap formed between the first side wall and the first wall,
         wherein the gap is formed over a distance from the front wall to the back wall along the first direction such that the gap forms a straight-line passage from the front wall toward the back wall; and
      a second wall which is disposed between the first wall and the back wall and forms the gap between the second wall and the first side wall, and
   wherein, in the ventilation chamber, a plurality of walls each including the second wall are arranged in a row in the first direction, and the first wall and the plurality of walls are disposed such that the first wall and respective walls of the plurality of walls are shifted from each other in a direction which intersects with the first direction.

2. An energy storage apparatus, comprising:
   an outer case; and
   an energy storage device housed in an inside of the outer case, wherein the outer case includes a ventilation chamber which makes the inside and an outside of the outer case communicate with each other, wherein the ventilation chamber comprises:
- a front wall in which a through hole communicating with the outside is formed;
- a back wall disposed at a position where the back wall, opposed faces the front wall;
- a first wall disposed between the through hole and the back wall; and
- a first side wall disposed in an extending manner along a first direction which intersects with the front wall with a gap formed between the first side wall and the first wall,
  - wherein the gap is formed over a distance from the front wall to the back wall along the first direction such that the gap forms a straight-line passage from the front wall toward the back wall,
- a second wall which is disposed between the first wall and the back wall, and forms the gap between the second wall and the first side wall, wherein the first wall and the second wall are disposed such that the first wall and the second wall are shifted from each other in a direction which intersects with the first direction, and wherein the first wall is parallel to the second wall.

3. The energy storage apparatus according to claim 1, wherein at least a portion of a bottom surface of the ventilation chamber has a difference in height such that the bottom surface in a vicinity of the through hole is low.

4. The energy storage apparatus according to claim 1, wherein the outer case further includes a ventilation pipe which is disposed outside the front wall and communicates with the through hole.

5. The energy storage apparatus according to claim 1, wherein a mesh portion, where a plurality of through holes are formed, is formed on the front wall.

6. The energy storage apparatus according to claim 1, wherein the ventilation chamber further includes an opening portion which is disposed at a position where the opening portion does not overlap with the gap as viewed in a plan view, and communicates with the inside of the outer case.

7. The energy storage apparatus according to claim 6, wherein the ventilation chamber further includes a waterproof gas permeable film which covers the opening portion.

8. An energy storage apparatus, comprising:
- an outer case including a first opening portion and a second opening portion which communicate with an outside respectively;
- a first member which covers the first opening portion and has waterproofness and gas permeability; and
- a second member which covers the second opening portion, and is configured to release pressure in an inside of the outer case when the pressure exceeds a predetermined pressure, wherein the outer case includes a ventilation chamber where at least one of the first opening portion and the second opening portion, and a through hole which communicates with the outside, are disposed, wherein the ventilation chamber comprises:
- a first ventilation chamber where the at least one of the first opening portion and the second opening portion is disposed; and
- a second ventilation chamber where the through hole is disposed, wherein the outer case further includes a ventilation pipe which is disposed outside the through hole and communicates with the through hole, wherein the first ventilation chamber, the second ventilation chamber, and the ventilation pipe are continuously arranged in this order from inside to outside of the outer case, wherein the at least one of the first opening portion and the second opening portion is disposed at a position where the at least one of the first opening portion and the second opening portion communicates with the outside through the through hole, and wherein assuming a direction of an axis of the first opening portion as a first axial direction a direction of an axis of the second opening portion as a second axial direction, and a direction of an axis of the through hole as a third axial direction, at least one of the first axial direction and the second axial direction intersects with the third axial direction.

9. The energy storage apparatus according to claim 8, wherein at least a portion of a bottom surface of the ventilation chamber has a difference in height such that the bottom surface in a vicinity of the through hole is low.

10. The energy storage apparatus according to claim 8, wherein the ventilation chamber includes both the first opening portion and the second opening portion, and the first member is disposed at a position remoter from the through hole than the second member in the ventilation chamber.

11. The energy storage apparatus according to claim 8, wherein the ventilation chamber includes both the first opening portion and the second opening portion, and is positioned above a bottom surface of the outer case, and
- wherein the first member is positioned higher than the second member in the ventilation chamber.

12. The energy storage apparatus according to claim 8, wherein the first member includes a sheet-like member and is bonded to a periphery of the first opening portion, and
- wherein the second member includes a sheet-like member and is bonded to a periphery of the second opening portion.

13. The energy storage apparatus according to claim 8, wherein the second member includes:
- a relief valve portion bonded to a periphery of the second opening portion; and
- a fixed portion connected to the relief valve portion and fixed to a portion outside the periphery of the second opening portion.

14. The energy storage apparatus according to claim 8, wherein mounting strength of the second member on the second opening portion is lower than mounting strength of the first member on the first opening portion.

15. The energy storage apparatus according to claim 8, wherein the outer case further includes a lid and a container,
- wherein the lid comprises a lower lid which covers an opening of the container, an upper lid disposed over the lower lid, and a side wall which connects the lower lid and the upper lid to each other,
- wherein the ventilation chamber is formed of the lower lid, the upper lid, and the side wall, and
- wherein the through hole, which makes the outside and the ventilation chamber communicate with each other, is formed in the side wall.

* * * * *